(12) United States Patent
Koskiniemi et al.

(10) Patent No.: US 9,509,054 B2
(45) Date of Patent: Nov. 29, 2016

(54) COMPACT POLARIZED ANTENNA AND METHODS

(71) Applicant: Pulse Finland OY, Kempele (FI)

(72) Inventors: Kimmo Koskiniemi, Oulu (FI); Pertti Nissinen, Kempele (FI)

(73) Assignee: Pulse Finland OY, Kempele (FI)

( * ) Notice: Subject to any disclaimer, the term of this patent is extended or adjusted under 35 U.S.C. 154(b) by 36 days.

(21) Appl. No.: 14/557,308

(22) Filed: Dec. 1, 2014

(65) Prior Publication Data

US 2015/0155631 A1 Jun. 4, 2015

Related U.S. Application Data

(62) Division of application No. 13/439,576, filed on Apr. 4, 2012, now Pat. No. 8,988,296.

(51) Int. Cl.

| H01Q 1/12 | (2006.01) |
|---|---|
| H01Q 9/04 | (2006.01) |
| G01S 19/14 | (2010.01) |
| H01Q 1/27 | (2006.01) |
| H01Q 9/42 | (2006.01) |

(52) U.S. Cl.
CPC .............. *H01Q 9/045* (2013.01); *G01S 19/14* (2013.01); *H01Q 1/273* (2013.01); *H01Q 9/0428* (2013.01); *H01Q 9/42* (2013.01); *Y10T 29/49016* (2015.01)

(58) Field of Classification Search
CPC ..... H01Q 9/045; H01Q 9/0428; H01Q 1/273
USPC .......................................... 343/718, 700 MS
See application file for complete search history.

(56) References Cited

U.S. PATENT DOCUMENTS

| 2,745,102 A | 5/1956 | Norgorden |
| 3,938,161 A | 2/1976 | Sanford |
| 4,004,228 A | 1/1977 | Mullett |
| 4,028,652 A | 6/1977 | Wakino et al. |
| 4,031,468 A | 6/1977 | Ziebell et al. |

(Continued)

FOREIGN PATENT DOCUMENTS

| CN | 1316797 A | 10/2001 |
| DE | 10104862 A1 | 8/2002 |

(Continued)

OTHER PUBLICATIONS

λ/4 printed monopole antenna for 2.45GHz, Nordic Semiconductor, White Paper, 2005, pp. 1-6.

(Continued)

*Primary Examiner* — Hoang V Nguyen
(74) *Attorney, Agent, or Firm* — Gazdzinski & Associates, PC

(57) ABSTRACT

A right-hand circular polarized antenna and associated methods. In one embodiment, a quarter-wave antenna configuration is used within a small form factor portable device (e.g. wristwatch). The antenna comprises a radiator element which operates in as a linear polarized antenna while the device is operating in free space. However, when the device is attached to a user (e.g. at a user's wrist), the antenna utilizes the loading of the user's body tissue in order to suppress unwanted signals (e.g. left hand polarized signals) to permit operation in circular polarized mode (e.g. right hand polarized mode), thereby allowing for increased sensitivity to received circularly polarized signals such as those emanated from global positioning satellites.

18 Claims, 17 Drawing Sheets

(56) References Cited

U.S. PATENT DOCUMENTS

| | | |
|---|---|---|
| 4,054,874 A | 10/1977 | Oltman, Jr. |
| 4,069,483 A | 1/1978 | Kaloi |
| 4,123,756 A | 10/1978 | Nagata et al. |
| 4,123,758 A | 10/1978 | Shibano et al. |
| 4,131,893 A | 12/1978 | Munson et al. |
| 4,201,960 A | 5/1980 | Skutta et al. |
| 4,255,729 A | 3/1981 | Fukasawa et al. |
| 4,313,121 A | 1/1982 | Campbell et al. |
| 4,356,492 A | 10/1982 | Kaloi |
| 4,370,657 A | 1/1983 | Kaloi |
| 4,423,396 A | 12/1983 | Makimoto et al. |
| 4,431,977 A | 2/1984 | Sokola et al. |
| 4,546,357 A | 10/1985 | Laughon et al. |
| 4,559,508 A | 12/1985 | Nishikawa et al. |
| 4,625,212 A | 11/1986 | Oda et al. |
| 4,652,889 A | 3/1987 | Bizouard et al. |
| 4,661,992 A | 4/1987 | Garay et al. |
| 4,692,726 A | 9/1987 | Green et al. |
| 4,703,291 A | 10/1987 | Nishikawa et al. |
| 4,706,050 A | 11/1987 | Andrews |
| 4,716,391 A | 12/1987 | Moutrie et al. |
| 4,740,765 A | 4/1988 | Ishikawa et al. |
| 4,742,562 A | 5/1988 | Kommrusch |
| 4,761,624 A | 8/1988 | Igarashi et al. |
| 4,800,348 A | 1/1989 | Rosar et al. |
| 4,800,392 A | 1/1989 | Garay et al. |
| 4,821,006 A | 4/1989 | Ishikawa et al. |
| 4,823,098 A | 4/1989 | DeMuro et al. |
| 4,827,266 A | 5/1989 | Sato et al. |
| 4,829,274 A | 5/1989 | Green et al. |
| 4,835,538 A | 5/1989 | McKenna et al. |
| 4,835,541 A | 5/1989 | Johnson et al. |
| 4,862,181 A | 8/1989 | Ponce et al. |
| 4,879,533 A | 11/1989 | De Muro et al. |
| 4,896,124 A | 1/1990 | Schwent |
| 4,907,006 A | 3/1990 | Nishikawa et al. |
| 4,954,796 A | 9/1990 | Green et al. |
| 4,965,537 A | 10/1990 | Kommrusch |
| 4,977,383 A | 12/1990 | Niiranen |
| 4,980,694 A | 12/1990 | Hines |
| 5,016,020 A | 5/1991 | Simpson |
| 5,017,932 A | 5/1991 | Ushiyama et al. |
| 5,043,738 A | 8/1991 | Shapiro et al. |
| 5,047,739 A | 9/1991 | Kuokkanen |
| 5,053,786 A | 10/1991 | Silverman et al. |
| 5,057,847 A | 10/1991 | Vaisanen |
| 5,061,939 A | 10/1991 | Nakase |
| 5,097,236 A | 3/1992 | Wakino et al. |
| 5,103,197 A | 4/1992 | Turunen et al. |
| 5,109,536 A | 4/1992 | Kommrusch |
| 5,155,493 A | 10/1992 | Thursby et al. |
| 5,157,363 A | 10/1992 | Puurunen et al. |
| 5,159,303 A | 10/1992 | Flink |
| 5,166,697 A | 11/1992 | Viladevall et al. |
| 5,170,173 A | 12/1992 | Krenz et al. |
| 5,203,021 A | 4/1993 | Repplinger et al. |
| 5,210,510 A | 5/1993 | Karsikas |
| 5,210,542 A | 5/1993 | Pett et al. |
| 5,220,335 A | 6/1993 | Huang |
| 5,229,777 A | 7/1993 | Doyle |
| 5,239,279 A | 8/1993 | Turunen et al. |
| 5,278,528 A | 1/1994 | Turunen |
| 5,281,326 A | 1/1994 | Galla |
| 5,298,873 A | 3/1994 | Ala-Kojola |
| 5,302,924 A | 4/1994 | Jantunen et al. |
| 5,304,968 A | 4/1994 | Ohtonen et al. |
| 5,307,036 A | 4/1994 | Turunen et al. |
| 5,319,328 A | 6/1994 | Turunen |
| 5,349,315 A | 9/1994 | Ala-Kojola |
| 5,349,700 A | 9/1994 | Parker |
| 5,351,023 A | 9/1994 | Niiranen |
| 5,354,463 A | 10/1994 | Turunen et al. |
| 5,355,142 A | 10/1994 | Marshall et al. |
| 5,357,262 A | 10/1994 | Blaese |
| 5,363,114 A | 11/1994 | Shoemaker |
| 5,369,782 A | 11/1994 | Kawano et al. |
| 5,382,959 A | 1/1995 | Pett et al. |
| 5,386,214 A | 1/1995 | Sugawara |
| 5,387,886 A | 2/1995 | Takalo et al. |
| 5,394,162 A | 2/1995 | Korovesis et al. |
| RE34,898 E | 4/1995 | Turunen et al. |
| 5,408,206 A | 4/1995 | Turunen et al. |
| 5,418,508 A | 5/1995 | Puurunen |
| 5,432,489 A | 7/1995 | Yrjoelae |
| 5,438,697 A | 8/1995 | Fowler et al. |
| 5,440,315 A | 8/1995 | Wright et al. |
| 5,442,280 A | 8/1995 | Baudart |
| 5,442,366 A | 8/1995 | Sanford |
| 5,444,453 A | 8/1995 | Lalezari |
| 5,467,065 A | 11/1995 | Turunen et al. |
| 5,473,295 A | 12/1995 | Turunen |
| 5,506,554 A | 4/1996 | Ala-Kojola |
| 5,508,668 A | 4/1996 | Prokkola |
| 5,510,802 A | 4/1996 | Tsuru et al. |
| 5,517,683 A | 5/1996 | Collett et al. |
| 5,521,561 A | 5/1996 | Yrjola et al. |
| 5,526,003 A | 6/1996 | Ogawa et al. |
| 5,532,703 A | 7/1996 | Stephens et al. |
| 5,541,560 A | 7/1996 | Turunen et al. |
| 5,541,617 A | 7/1996 | Connolly et al. |
| 5,543,764 A | 8/1996 | Turunen et al. |
| 5,550,519 A | 8/1996 | Korpela |
| 5,557,287 A | 9/1996 | Pottala et al. |
| 5,557,292 A | 9/1996 | Nygren et al. |
| 5,566,441 A | 10/1996 | Marsh et al. |
| 5,570,071 A | 10/1996 | Ervasti |
| 5,585,771 A | 12/1996 | Ervasti et al. |
| 5,585,810 A | 12/1996 | Tsuru et al. |
| 5,589,844 A | 12/1996 | Belcher et al. |
| 5,594,395 A | 1/1997 | Niiranen |
| 5,604,471 A | 2/1997 | Rattile et al. |
| 5,627,502 A | 5/1997 | Ervasti |
| 5,649,316 A | 7/1997 | Prudhomme et al. |
| 5,668,561 A | 9/1997 | Perrotta et al. |
| 5,675,301 A | 10/1997 | Nappa et al. |
| 5,689,221 A | 11/1997 | Niiranen et al. |
| 5,694,135 A | 12/1997 | Dikun et al. |
| 5,696,517 A | 12/1997 | Kawahata et al. |
| 5,703,600 A | 12/1997 | Burrell et al. |
| 5,709,832 A | 1/1998 | Hayes et al. |
| 5,711,014 A | 1/1998 | Crowley et al. |
| 5,717,368 A | 2/1998 | Niiranen |
| 5,731,749 A | 3/1998 | Yrjoelae et al. |
| 5,734,305 A | 3/1998 | Ervasti |
| 5,734,350 A | 3/1998 | Deming et al. |
| 5,734,351 A | 3/1998 | Ojantakanen et al. |
| 5,739,735 A | 4/1998 | Pyykkoe et al. |
| 5,742,259 A | 4/1998 | Annamaa |
| 5,757,327 A | 5/1998 | Yajima et al. |
| 5,760,746 A | 6/1998 | Kawahata |
| 5,764,190 A | 6/1998 | Murch et al. |
| 5,767,809 A | 6/1998 | Chuang et al. |
| 5,768,217 E | 6/1998 | Sonoda et al. |
| 5,777,581 A | 7/1998 | Lilly et al. |
| 5,777,585 A | 7/1998 | Tsuda et al. |
| 5,793,269 A | 8/1998 | Ervasti et al. |
| 5,797,084 A | 8/1998 | Tsuru et al. |
| 5,812,094 A | 9/1998 | Maldonado |
| 5,815,048 A | 9/1998 | Ala-Kojola et al. |
| 5,822,705 A | 10/1998 | Lehtola |
| 5,852,421 A | 12/1998 | Maldonado |
| 5,861,854 A | 1/1999 | Kawahata et al. |
| 5,874,926 A | 2/1999 | Tsuru et al. |
| 5,880,697 A | 3/1999 | McCarrick et al. |
| 5,886,668 A | 3/1999 | Pedersen et al. |
| 5,892,490 A | 4/1999 | Asakura et al. |
| 5,903,820 A | 5/1999 | Hagstroem |
| 5,905,475 A | 5/1999 | Annamaa |
| 5,920,290 A | 7/1999 | McDonough et al. |
| 5,926,139 A | 7/1999 | Korisch |
| 5,929,813 A | 7/1999 | Eggleston |
| 5,936,583 A | 8/1999 | Sekine et al. |
| 5,943,016 A | 8/1999 | Snyder, Jr. et al. |
| 5,952,975 A | 9/1999 | Pedersen et al. |

(56) References Cited

U.S. PATENT DOCUMENTS

| | | |
|---|---|---|
| 5,959,583 A | 9/1999 | Funk |
| 5,963,180 A | 10/1999 | Leisten |
| 5,966,097 A | 10/1999 | Fukasawa et al. |
| 5,970,393 A | 10/1999 | Khorrami et al. |
| 5,977,710 A | 11/1999 | Kuramoto et al. |
| 5,986,606 A | 11/1999 | Kossiavas et al. |
| 5,986,608 A | 11/1999 | Korisch et al. |
| 5,990,848 A | 11/1999 | Annamaa et al. |
| 5,999,132 A | 12/1999 | Kitchener et al. |
| 6,005,529 A | 12/1999 | Hutchinson |
| 6,006,419 A | 12/1999 | Vandendolder et al. |
| 6,008,764 A | 12/1999 | Ollikainen et al. |
| 6,009,311 A | 12/1999 | Killion et al. |
| 6,014,106 A | 1/2000 | Annamaa |
| 6,016,130 A | 1/2000 | Annamaa |
| 6,023,608 A | 2/2000 | Yrjoelae et al. |
| 6,031,496 A | 2/2000 | Kuittinen et al. |
| 6,034,637 A | 3/2000 | McCoy et al. |
| 6,037,848 A | 3/2000 | Alila et al. |
| 6,043,780 A | 3/2000 | Funk et al. |
| 6,052,096 A | 4/2000 | Tsuru et al. |
| 6,072,434 A | 6/2000 | Papatheodorou |
| 6,078,231 A | 6/2000 | Pelkonen |
| 6,091,363 A | 7/2000 | Komatsu et al. |
| 6,091,365 A | 7/2000 | Derneryd et al. |
| 6,097,345 A | 8/2000 | Walton |
| 6,100,849 A | 8/2000 | Tsubaki et al. |
| 6,112,108 A | 8/2000 | Tepper et al. |
| 6,121,931 A | 9/2000 | Levi |
| 6,133,879 A | 10/2000 | Grangeat et al. |
| 6,134,421 A | 10/2000 | Lee et al. |
| 6,140,966 A | 10/2000 | Pankinaho |
| 6,140,973 A | 10/2000 | Annamaa et al. |
| 6,147,650 A | 11/2000 | Kawahata et al. |
| 6,157,819 A | 12/2000 | Vuokko et al. |
| 6,177,908 B1 | 1/2001 | Kawahata et al. |
| 6,185,434 B1 | 2/2001 | Hagstreom et al. |
| 6,190,942 B1 | 2/2001 | Wilm et al. |
| 6,195,049 B1 | 2/2001 | Kim et al. |
| 6,204,826 B1 | 3/2001 | Rutkowski et al. |
| 6,215,376 B1 | 4/2001 | Hagstroem et al. |
| 6,246,368 B1 | 6/2001 | Deming et al. |
| 6,252,552 B1 | 6/2001 | Tarvas et al. |
| 6,252,554 B1 | 6/2001 | Isohätälä et al. |
| 6,255,994 B1 | 7/2001 | Saito |
| 6,268,831 B1 | 7/2001 | Sanford |
| 6,281,848 B1 | 8/2001 | Nagumo et al. |
| 6,295,029 B1 | 9/2001 | Chen et al. |
| 6,297,776 B1 | 10/2001 | Pankinaho |
| 6,304,220 B1 | 10/2001 | Herve et al. |
| 6,308,720 B1 | 10/2001 | Modi |
| 6,316,975 B1 | 11/2001 | O'Toole et al. |
| 6,323,811 B1 | 11/2001 | Tsubaki et al. |
| 6,326,921 B1 | 12/2001 | Egorov et al. |
| 6,337,663 B1 | 1/2002 | Chi-Ming |
| 6,340,954 B1 | 1/2002 | Annamaa et al. |
| 6,342,859 B1 | 1/2002 | Kurz et al. |
| 6,343,208 B1 | 1/2002 | Ying |
| 6,346,914 B1 | 2/2002 | Annamaa |
| 6,348,892 B1 | 2/2002 | Annamaa et al. |
| 6,353,443 B1 | 3/2002 | Ying |
| 6,366,243 B1 | 4/2002 | Isohatala et al. |
| 6,377,827 B1 | 4/2002 | Rydbeck |
| 6,380,905 B1 | 4/2002 | Annamaa et al. |
| 6,396,444 B1 | 5/2002 | Goward et al. |
| 6,404,394 B1 | 6/2002 | Hill |
| 6,417,813 B1 | 7/2002 | Durham |
| 6,421,014 B1 | 7/2002 | Sanad |
| 6,423,915 B1 | 7/2002 | Winter |
| 6,429,818 B1 | 8/2002 | Johnson et al. |
| 6,452,551 B1 | 9/2002 | Chen |
| 6,452,558 B1 | 9/2002 | Saitou et al. |
| 6,456,249 B1 | 9/2002 | Johnson et al. |
| 6,459,413 B1 | 10/2002 | Tseng et al. |
| 6,462,716 B1 | 10/2002 | Kushihi |
| 6,469,673 B2 | 10/2002 | Kaiponen |
| 6,473,056 B2 | 10/2002 | Annamaa |
| 6,476,767 B2 | 11/2002 | Aoyama et al. |
| 6,476,769 B1 | 11/2002 | Lehtola |
| 6,480,155 B1 | 11/2002 | Eggleston |
| 6,483,462 B2 | 11/2002 | Weinberger |
| 6,498,586 B2 | 12/2002 | Pankinaho |
| 6,501,425 B1 | 12/2002 | Nagumo et al. |
| 6,515,625 B1 | 2/2003 | Johnson |
| 6,518,925 B1 | 2/2003 | Annamaa et al. |
| 6,529,168 B2 | 3/2003 | Mikkola et al. |
| 6,529,749 B1 | 3/2003 | Hayes et al. |
| 6,535,170 B2 | 3/2003 | Sawamura et al. |
| 6,538,604 B1 | 3/2003 | Isohaetaelae et al. |
| 6,538,607 B2 | 3/2003 | Barna |
| 6,542,050 B1 | 4/2003 | Arai et al. |
| 6,549,167 B1 | 4/2003 | Yoon |
| 6,552,686 B2 | 4/2003 | Ollikainen et al. |
| 6,556,812 B1 | 4/2003 | Pennanen et al. |
| 6,566,944 B1 | 5/2003 | Pehlke et al. |
| 6,580,396 B2 | 6/2003 | Lin |
| 6,580,397 B2 | 6/2003 | Lindell |
| 6,600,449 B2 | 7/2003 | Onaka et al. |
| 6,603,430 B1 | 8/2003 | Hill et al. |
| 6,606,016 B2 | 8/2003 | Takamine |
| 6,611,235 B2 | 8/2003 | Barna et al. |
| 6,614,400 B2 | 9/2003 | Egorov |
| 6,614,401 B2 | 9/2003 | Onaka et al. |
| 6,614,405 B1 | 9/2003 | Mikkonen et al. |
| 6,634,564 B2 | 10/2003 | Kuramochi |
| 6,636,181 B2 | 10/2003 | Asano et al. |
| 6,639,564 B2 | 10/2003 | Johnson |
| 6,646,606 B2 | 11/2003 | Mikkola et al. |
| 6,650,295 B2 | 11/2003 | Ollikainen et al. |
| 6,657,593 B2 | 12/2003 | Nagumo et al. |
| 6,657,595 B1 | 12/2003 | Phillips et al. |
| 6,670,926 B2 | 12/2003 | Miyasaka |
| 6,677,903 B2 | 1/2004 | Wang |
| 6,680,705 B2 | 1/2004 | Tan et al. |
| 6,683,573 B2 | 1/2004 | Park |
| 6,693,594 B2 | 2/2004 | Pankinaho et al. |
| 6,717,551 B1 | 4/2004 | Desclos et al. |
| 6,727,857 B2 | 4/2004 | Mikkola et al. |
| 6,734,825 B1 | 5/2004 | Guo et al. |
| 6,734,826 B1 | 5/2004 | Dai et al. |
| 6,738,022 B2 | 5/2004 | Klaavo et al. |
| 6,741,214 B1 | 5/2004 | Kadambi et al. |
| 6,753,813 B2 | 6/2004 | Kushihi |
| 6,759,989 B2 | 7/2004 | Tarvas et al. |
| 6,765,536 B2 | 7/2004 | Phillips et al. |
| 6,774,853 B2 | 8/2004 | Wong et al. |
| 6,781,545 B2 | 8/2004 | Sung |
| 6,801,166 B2 | 10/2004 | Mikkola et al. |
| 6,801,169 B1 | 10/2004 | Chang et al. |
| 6,806,835 B2 | 10/2004 | Iwai et al. |
| 6,819,287 B2 | 11/2004 | Sullivan et al. |
| 6,819,293 B2 | 11/2004 | De Graauw |
| 6,825,818 B2 | 11/2004 | Toncich |
| 6,836,249 B2 | 12/2004 | Kenoun et al. |
| 6,847,329 B2 | 1/2005 | Ikegaya et al. |
| 6,856,293 B2 | 2/2005 | Bordi |
| 6,862,437 B1 | 3/2005 | McNamara |
| 6,862,441 B2 | 3/2005 | Ella |
| 6,873,291 B2 | 3/2005 | Aoyama et al. |
| 6,876,329 B2 | 4/2005 | Milosavljevic |
| 6,882,317 B2 | 4/2005 | Koskiniemi et al. |
| 6,891,507 B2 | 5/2005 | Kushihi et al. |
| 6,897,810 B2 | 5/2005 | Kuo et al. |
| 6,900,768 B2 | 5/2005 | Iguchi et al. |
| 6,903,692 B2 | 6/2005 | Kivekas et al. |
| 6,911,945 B2 | 6/2005 | Korva |
| 6,922,171 B2 | 7/2005 | Annamaa et al. |
| 6,925,689 B2 | 8/2005 | Folkmar |
| 6,927,729 B2 | 8/2005 | Legay |
| 6,937,196 B2 | 8/2005 | Korva |
| 6,950,065 B2 | 9/2005 | Ying et al. |
| 6,950,066 B2 | 9/2005 | Hendler et al. |
| 6,950,068 B2 | 9/2005 | Bordi et al. |
| 6,950,072 B2 | 9/2005 | Miyata et al. |

(56) References Cited

U.S. PATENT DOCUMENTS

| | | |
|---|---|---|
| 6,952,144 B2 | 10/2005 | Javor |
| 6,952,187 B2 | 10/2005 | Annamaa et al. |
| 6,958,730 B2 | 10/2005 | Nagumo et al. |
| 6,961,544 B1 | 11/2005 | Hagstroem |
| 6,963,308 B2 | 11/2005 | Korva |
| 6,963,310 B2 | 11/2005 | Horita et al. |
| 6,967,618 B2 | 11/2005 | Ojantakanen et al. |
| 6,975,278 B2 | 12/2005 | Song et al. |
| 6,980,158 B2 | 12/2005 | Iguchi et al. |
| 6,985,108 B2 | 1/2006 | Mikkola et al. |
| 6,992,543 B2 | 1/2006 | Luetzelschwab et al. |
| 6,995,710 B2 | 2/2006 | Sugimoto et al. |
| 7,023,341 B2 | 4/2006 | Stilp |
| 7,031,744 B2 | 4/2006 | Kuriyama et al. |
| 7,034,752 B2 | 4/2006 | Sekiguchi et al. |
| 7,042,403 B2 | 5/2006 | Colburn et al. |
| 7,053,841 B2 | 5/2006 | Ponce et al. |
| 7,054,671 B2 | 5/2006 | Kaiponen et al. |
| 7,057,560 B2 | 6/2006 | Erkocevic |
| 7,061,430 B2 | 6/2006 | Zheng et al. |
| 7,081,857 B2 | 7/2006 | Kinnunen et al. |
| 7,084,831 B2 | 8/2006 | Takagi et al. |
| 7,099,690 B2 | 8/2006 | Milosavljevic |
| 7,113,133 B2 | 9/2006 | Chen et al. |
| 7,119,749 B2 | 10/2006 | Miyata et al. |
| 7,126,546 B2 | 10/2006 | Annamaa et al. |
| 7,129,893 B2 | 10/2006 | Otaka et al. |
| 7,136,019 B2 | 11/2006 | Mikkola et al. |
| 7,136,020 B2 | 11/2006 | Yamaki |
| 7,142,824 B2 | 11/2006 | Kojima et al. |
| 7,148,847 B2 | 12/2006 | Yuanzhu |
| 7,148,849 B2 | 12/2006 | Lin |
| 7,148,851 B2 | 12/2006 | Takaki et al. |
| 7,170,464 B2 | 1/2007 | Tang et al. |
| 7,176,838 B1 | 2/2007 | Kinezos |
| 7,180,455 B2 | 2/2007 | Oh et al. |
| 7,193,574 B2 | 3/2007 | Chiang et al. |
| 7,205,942 B2 | 4/2007 | Wang et al. |
| 7,215,283 B2 | 5/2007 | Boyle |
| 7,218,280 B2 | 5/2007 | Annamaa et al. |
| 7,218,282 B2 | 5/2007 | Humpfer et al. |
| 7,224,313 B2 | 5/2007 | McKinzie et al. |
| 7,230,574 B2 | 6/2007 | Johnson |
| 7,233,775 B2 | 6/2007 | De Graauw |
| 7,237,318 B2 | 7/2007 | Annamaa et al. |
| 7,256,743 B2 | 8/2007 | Korva |
| 7,274,334 B2 | 9/2007 | O'Riordan et al. |
| 7,283,097 B2 | 10/2007 | Wen et al. |
| 7,289,064 B2 | 10/2007 | Cheng |
| 7,292,200 B2 | 11/2007 | Posluszny et al. |
| 7,319,432 B2 | 1/2008 | Andersson |
| 7,330,153 B2 | 2/2008 | Rentz |
| 7,333,067 B2 | 2/2008 | Hung et al. |
| 7,339,528 B2 | 3/2008 | Wang et al. |
| 7,340,286 B2 | 3/2008 | Korva et al. |
| 7,345,634 B2 | 3/2008 | Ozkar et al. |
| 7,352,326 B2 | 4/2008 | Korva et al. |
| 7,355,270 B2 | 4/2008 | Hasebe et al. |
| 7,358,902 B2 | 4/2008 | Erkocevic |
| 7,375,695 B2 | 5/2008 | Ishizuka et al. |
| 7,381,774 B2 | 6/2008 | Bish et al. |
| 7,382,319 B2 | 6/2008 | Kawahata et al. |
| 7,385,556 B2 | 6/2008 | Chung et al. |
| 7,388,543 B2 | 6/2008 | Vance |
| 7,391,378 B2 | 6/2008 | Mikkola et al. |
| 7,405,702 B2 | 7/2008 | Annamaa et al. |
| 7,417,588 B2 | 8/2008 | Castany et al. |
| 7,423,592 B2 | 9/2008 | Pros et al. |
| 7,432,860 B2 | 10/2008 | Huynh |
| 7,439,929 B2 | 10/2008 | Ozkar |
| 7,443,344 B2 | 10/2008 | Boyle |
| 7,468,700 B2 | 12/2008 | Milosavlejevic |
| 7,468,709 B2 | 12/2008 | Niemi et al. |
| 7,498,990 B2 | 3/2009 | Park et al. |
| 7,501,983 B2 | 3/2009 | Mikkola |
| 7,502,598 B2 | 3/2009 | Kronberger et al. |
| 7,589,678 B2 | 9/2009 | Perunka et al. |
| 7,616,158 B2 | 11/2009 | Mak et al. |
| 7,633,449 B2 | 12/2009 | Oh et al. |
| 7,663,551 B2 | 2/2010 | Nissinen et al. |
| 7,679,565 B2 | 3/2010 | Sorvala |
| 7,692,543 B2 | 4/2010 | Copeland et al. |
| 7,710,325 B2 | 5/2010 | Cheng |
| 7,724,204 B2 | 5/2010 | Annamaa et al. |
| 7,760,146 B2 | 7/2010 | Ollikainen |
| 7,764,245 B2 | 7/2010 | Loyet |
| 7,786,938 B2 | 8/2010 | Sorvala et al. |
| 7,800,544 B2 | 9/2010 | Thornell-Pers |
| 7,830,327 B2 | 11/2010 | He |
| 7,843,397 B2 | 11/2010 | Boyle |
| 7,889,139 B2 | 2/2011 | Hobson et al. |
| 7,889,143 B2 | 2/2011 | Milosavljevic et al. |
| 7,901,617 B2 | 3/2011 | Taylor et al. |
| 7,903,035 B2 | 3/2011 | Mikkola et al. |
| 7,916,086 B2 | 3/2011 | Koskiniemi et al. |
| 7,963,347 B2 | 6/2011 | Pabon |
| 7,973,720 B2 | 7/2011 | Sorvala |
| 8,049,670 B2 | 11/2011 | Jung et al. |
| 8,098,202 B2 | 1/2012 | Annamaa et al. |
| 8,179,322 B2 | 5/2012 | Nissinen |
| 8,193,998 B2 | 6/2012 | Baliarda et al. |
| 8,378,892 B2 | 2/2013 | Sorvala et al. |
| 8,466,756 B2 | 6/2013 | Milosavljevic et al. |
| 8,473,017 B2 | 6/2013 | Milosavljevic et al. |
| 8,564,485 B2 | 10/2013 | Milosavljevic et al. |
| 8,570,838 B2 * | 10/2013 | Fujisawa ............... G04C 10/02 343/718 |
| 8,629,813 B2 | 1/2014 | Milosavljevic |
| 2001/0050636 A1 | 12/2001 | Weinberger |
| 2002/0183013 A1 | 12/2002 | Auckland et al. |
| 2002/0196192 A1 | 12/2002 | Nagumo et al. |
| 2003/0146873 A1 | 8/2003 | Blancho |
| 2004/0090378 A1 | 5/2004 | Dai et al. |
| 2004/0137950 A1 | 7/2004 | Bolin et al. |
| 2004/0145525 A1 | 7/2004 | Ayoub et al. |
| 2004/0171403 A1 | 9/2004 | Mikkola |
| 2005/0057401 A1 | 3/2005 | Yuanzhu |
| 2005/0159131 A1 | 7/2005 | Shibagaki et al. |
| 2005/0176481 A1 | 8/2005 | Jeong |
| 2006/0071857 A1 | 4/2006 | Pelzer |
| 2006/0192723 A1 | 8/2006 | Harada et al. |
| 2007/0042615 A1 | 2/2007 | Liao |
| 2007/0082789 A1 | 4/2007 | Nissila et al. |
| 2007/0152881 A1 | 7/2007 | Chan |
| 2007/0188388 A1 | 8/2007 | Feng et al. |
| 2008/0055164 A1 | 3/2008 | Zhang et al. |
| 2008/0059106 A1 | 3/2008 | Wight et al. |
| 2008/0088511 A1 | 4/2008 | Sorvala et al. |
| 2008/0266199 A1 | 10/2008 | Milosavljevic et al. |
| 2009/0009415 A1 | 1/2009 | Tanska et al. |
| 2009/0135066 A1 | 5/2009 | Raappana et al. |
| 2009/0174604 A1 | 7/2009 | Keskitalo et al. |
| 2009/0196160 A1 | 8/2009 | Crombach |
| 2009/0197654 A1 | 8/2009 | Teshima et al. |
| 2009/0231213 A1 | 9/2009 | Ishimiya |
| 2010/0220016 A1 | 9/2010 | Nissinen et al. |
| 2010/0244978 A1 | 9/2010 | Milosavljevic et al. |
| 2010/0309092 A1 | 12/2010 | Lambacka |
| 2011/0102274 A1 | 5/2011 | Fujisawa |
| 2011/0133994 A1 | 6/2011 | Korva |
| 2011/0169711 A1 | 7/2011 | Bobier et al. |
| 2012/0105288 A1 | 5/2012 | Abe |
| 2012/0119955 A1 | 5/2012 | Milosavljevic et al. |

FOREIGN PATENT DOCUMENTS

| | | |
|---|---|---|
| DE | 10150149 A1 | 4/2003 |
| EP | 0208424 A1 | 1/1987 |
| EP | 0376643 A2 | 7/1990 |
| EP | 0751043 A1 | 1/1997 |
| EP | 0807988 A1 | 11/1997 |
| EP | 0831547 A2 | 3/1998 |
| EP | 0851530 A2 | 7/1998 |
| EP | 0923158 A2 | 6/1999 |

(56) References Cited

FOREIGN PATENT DOCUMENTS

| | | |
|---|---|---|
| EP | 1014487 A1 | 6/2000 |
| EP | 1024553 A1 | 8/2000 |
| EP | 1067627 A1 | 1/2001 |
| EP | 1294048 A2 | 3/2003 |
| EP | 1329980 A1 | 7/2003 |
| EP | 1361623 A1 | 11/2003 |
| EP | 1406345 A1 | 4/2004 |
| EP | 1453137 A1 | 9/2004 |
| EP | 1220456 A3 | 10/2004 |
| EP | 1467456 A2 | 10/2004 |
| EP | 1753079 A1 | 2/2007 |
| FI | 20020829 A | 11/2003 |
| FI | 118782 B | 3/2008 |
| FR | 2553584 A1 | 4/1985 |
| FR | 2724274 A1 | 3/1996 |
| FR | 2873247 A1 | 1/2006 |
| GB | 2266997 A | 11/1993 |
| GB | 2360422 A | 9/2001 |
| GB | 2389246 A | 12/2003 |
| JP | S59202831 A | 11/1984 |
| JP | 560206304 A | 10/1985 |
| JP | 561245704 A | 11/1986 |
| JP | H06152463 A | 5/1994 |
| JP | H07131234 A | 5/1995 |
| JP | H07221536 A | 8/1995 |
| JP | H07249923 A | 9/1995 |
| JP | H07307612 A | 11/1995 |
| JP | H08216571 A | 8/1996 |
| JP | H0983242 A | 3/1997 |
| JP | H09260934 A | 10/1997 |
| JP | H09307344 A | 11/1997 |
| JP | H1028013 A | 1/1998 |
| JP | H10107671 A | 4/1998 |
| JP | H10173423 A | 6/1998 |
| JP | H10209733 A | 8/1998 |
| JP | H10224142 A | 8/1998 |
| JP | H10322124 A | 12/1998 |
| JP | H10327011 A | 12/1998 |
| JP | H114113 A | 1/1999 |
| JP | H114117 A | 1/1999 |
| JP | H1168456 A | 3/1999 |
| JP | H11127010 A | 5/1999 |
| JP | H11127014 A | 5/1999 |
| JP | H11136025 A | 5/1999 |
| JP | H11355033 A | 12/1999 |
| JP | 2000278028 A | 10/2000 |
| JP | 2001053543 A | 2/2001 |
| JP | 2001217631 A | 8/2001 |
| JP | 2001267833 A | 9/2001 |
| JP | 2001326513 A | 11/2001 |
| JP | 2002319811 A | 10/2002 |
| JP | 2002329541 A | 11/2002 |
| JP | 2002335117 A | 11/2002 |
| JP | 2003060417 A | 2/2003 |
| JP | 2003124730 A | 4/2003 |
| JP | 2003179426 A | 6/2003 |
| JP | 2004112028 A | 4/2004 |
| JP | 2004363859 A | 12/2004 |
| JP | 2005005985 A | 1/2005 |
| JP | 2005252661 A | 9/2005 |
| KR | 102001008052 | 8/2001 |
| KR | 20020096016 A | 12/2002 |
| SE | 511900 C2 | 12/1999 |
| WO | WO-9200635 A1 | 1/1992 |
| WO | WO-9627219 A1 | 9/1996 |
| WO | WO-9801919 A2 | 1/1998 |
| WO | WO-9930479 A1 | 6/1999 |
| WO | WO-0120718 A1 | 3/2001 |
| WO | WO-0129927 A1 | 4/2001 |
| WO | WO-0133665 A1 | 5/2001 |
| WO | WO-0161781 A1 | 8/2001 |
| WO | WO-2004017462 A1 | 2/2004 |
| WO | WO-2004057697 A2 | 7/2004 |
| WO | WO-2004100313 A1 | 11/2004 |
| WO | WO-2004112189 A1 | 12/2004 |
| WO | WO-2005062416 A1 | 7/2005 |
| WO | WO-2007012697 A1 | 2/2007 |
| WO | WO-2010122220 A1 | 10/2010 |

OTHER PUBLICATIONS

"A 13.56MHz RFID Device and Software for Mobile Systems", by H. Ryoson, at al., Micro Systems Network Co., 2004 IEEE, pp. 241-244.

"A Novel Approach of a Planar Multi-Band Hybrid Series Feed Network for Use in Antenna Systems Operating at Millimeter Wave Frequencies," by M.W. Elsallaland B.L. Hauck, Rockwell Collins, Inc., pp. 15-24, waelsall@rockwellcollins.com and blhauck@rockwellcollins.com.

Abedin, M. F. and M. Ali, "Modifying the ground plane and its elDect on planar inverted-F antennas (PIFAs) for mobile handsets," IEEE Antennas and Wireless Propagation Letters, vol. 2, 226-229, 2003.

"An Adaptive Microstrip Patch Antenna for Use in Portable Transceivers", Rostbakken et al., Vehicular Technology Conference, 1996, Mobile Technology for The Human Race, pp. 339-343.

C. R. Rowell and R. D, Murch, "A compact PIFA suitable for dual frequency 900/1800-MHz operation," IEEE Trans. Antennas Propag., vol. 46, No. 4, pp. 596-598, Apr. 1998.

Chen, Jin-Sen, et al., "CPW-fed Ring Slot of Antenna with Small Ground Plane," Department of Electronic Engineering, Cheng Shiu University, 3 pgs.

Cheng- Nan Hu, Willey Chen, and Book Tai, "A Compact Multi-Band Antenna Design for Mobile Handsets", APMC 2005 Proceedings.

Chi, Yun-Wen, et al. "Quarter-Wavelength Printed Loop Antenna With an Internal Printed Matching Circuit for GSM/DCS/PCS/UMTS Operation in the Mobile Phone," IEEE Transactions on Antennas and Propagation, vol. 57, No. 9m Sep. 2009, pp. 2541-2547.

Chiu, C.-W., at al., "A Meandered Loop Antenna for LTE/WWAN Operations in a Smartphone," Progress in Electromagnetics Research C, vol. 16, pp. 147-160, 2010.

"Dual Band Antenna for Hand Held Portable Telephones", Liu et al., Electronics Letters, vol, 32, No. 7, 1996, pp. 609-610.

Endo, T., Y. Sunahara, S. Satoh and T. Katagi, "Resonant Frequency and Radiation Efficiency of Meander Line Antennas," Electronics and Communications in Japan, Part 2, vol. 83, No. 1, 52-58, 2000.

European Office Action, May 30, 2005 issued during prosecution of EP 04 396 001.2-1248.

Examination Report dated May 3, 2006 issued by the EPO for European Patent Application No. 04 396 079.8.

Extended European Search Report dated Jan. 30, 2013, issued by the EPO for EP Patent Application No. 12177740.3.

F.R. Hsiao, et al. "A dual-band planar inverted-F patch antenna with a branch-line slit," Microwave Opt. Technol. Lett, vol. 32, Feb. 20, 2002.

Gobien, Andrew, T. Investigation of Low Profile Antenna Designs for Use in Hand-Held Radios, Ch.3, The Inverted-L Antenna and Variations; Aug. 1997, pp. 42-76.

Griffin, Donald W. et al., "Electromagnetic Design Aspects of Packages for Monolithic Microwave Integrated Circuit-Based Arrays with Integrated Antenna Elements", IEEE Transactions on Antennas and Propagation, vol. 43, No. 9, pp. 927-931, Sep. 1995.

Guo, Y. X. and H. S. Tan, "New compact six-band internal antenna," IEEE Antennas and Wireless Propagation Letters, vol. 3, 295-297, 2004.

Guo, Y. X. and Y.W. Chia and Z. N. Chen, "Miniature built-in quadband antennas for mobile handsets", IEEE Antennas Wireless Propag. Left., vol. 2, pp. 30-32, 2004.

Hasse, R., A. Byndas, and M. E. Bialkowski, "Improvement of compact terminal antenna performance by incorporating open-end slots in ground plane," IEEE Microwave and Wireless Components Letters, vol. 14, 283-285, 2004.

Hoon Park, et al. "Design of an Internal antenna with wide and multiband characteristics for a mobile handset", IEEE Microw. & Opt. Tech. Lett. vol. 48, No. 5, May 2006.

(56) References Cited

OTHER PUBLICATIONS

Hoon Park, et al. "Design of Planar Inverted-F Antenna With Very Wide Impedance Bandwidth", IEEE Microw. & Wireless Comp., Lett., vol. 16, No. 3, pp. 113-115-, Mar. 2006.

I. Ang, Y. X. Guo, and Y. W. Chia, "Compact internal quad-band antenna for mobile phones" Micro. Opt. Technol. Lett., vol. 38, No. 3 pp. 217-223 Aug. 2003.

"Improved Bandwidth of Microstrip Antennas using Parasitic Elements," IEE Proc. vol. 127, Pt. H. No. 4, Aug. 1980.

International Preliminary Report on Patentability for International Application No. PCT/FI2004/000554, mailed on May 1, 2006.

Jing, X., et al.; "Compact Planar Monopole Antenna for Multi-Band Mobile Phones"; Microwave Conference Proceedings, 4.-7.12. 2005.APMC 2005, Asia-Pacific Conference Proceedings, vol. 4.

Joshi, Ravi K., et al., "Broadband Concentric Rings Fractal Slot Antenna", XXVIIIth General Assembly of International Union of Radio Science (URSI). (Oct. 23-29, 2005), 4 Pgs.

Kim, B, C., J. H. Yun, and H. D, Choi, "Small wideband PIFA for mobile phones at 1800 MHz," IEEE International Conference on Vehicular Technology, 27-29, Daejeon, South Korea, May 2004.

Kim, Kihong et al., "Integrated Dipole Antennas on Silicon substrates for Intra-Chip Communication", IEEE, pp. 1582-1585, 1999.

Kivekas., O., J. 0llikainen, T. Lehtiniemi, and P. Vainikainen, "Bandwidth, SAR, and eciency of internal mobile phone antennas," IEEE Transactions on Electromagnetic Compatibility, vol. 46, 71-86, 2004.

K-L Wong, Planar Antennas for Wireless Communications, Hoboken, NJ: Willey, 2003, ch. 2.

Lin, Sheng-Yu; Liu, Hsien-Wen; Wang, Chung-Hsun; and Yang, Chang-Fa, "A miniature Coupled loop Antenna to be Embedded in a Mobile Phone for Penta-band Applications," Progress in Electromagnetics Research Symposium Proceedings, Xi'an, China, Mar. 22-26, 2010, pp. 721-724.

Lindberg., P. and E. Ojefors, "A bandwidth enhancement technique for mobile handset antennas using wavetraps," IEEE Transactions on Antennas and Propagation, vol. 54, 2226{2232, 2006.

"Lte—an introduction," Ericsson White Paper, Jun. 2009, pp. 1-16.

Marta Martinez- Vazquez, et al., "Integrated Planar Multiband Antennas for Personal Communication Handsets", IEEE Trasactions on Antennas and propagation, vol. 54, No. 2, Feb. 2006.

P. Ciais, et al., "Compact Internal Multiband Antennas for Mobile and WLAN Standards", Electronic Letters, vol. 40, No. 15, pp. 920-921, Jul. 2004.

P. Ciais, R. Staraj, G. Kossiavas, and C. Luxey, "Design of an internal quadband antenna for mobile phones", IEEE Microwave Wireless Comp. Lett., vol. 14, No. 4, pp. 148-150, Apr. 2004.

P. Salonen, et al. "New slot configurations for dual-band planar inverted-F antenna," Microwave Opt. Technol, vol. 28, pp. 293-298, 2001.

Papapolymerou, Ioannis et al, "Micromachined Patch Antennas", IEEE Transactions on Antennas and Propagation, vol. 46, No. 2, pp. 275-283, Feb. 1998.

"Spectrum Analysis for Future LTE Deployments," Motorola White Paper, 2007, pp. 1-8.

Product of the Month, RFDesign, "GSM/CPRS Quad Band Power Amp Includes Antenna Switch," 1 page, reprinted Nov. 2004 issue of RF Design (www.rfdesign.com) Copyright 2004, Freescale Semiconductor, RFD-24-EK.

S. Tarvas, et al. "An internal dual-band mobile phone antenna," in 2000 IEEE Antennas Propagat Soc. Int. Symp. Dig., pp. 266-269, Salt Lake City, UT, USA.

See, C.H., et al, "Design of Planar Metal-Plate Monopole Antenna for Third Generation Mobile Handsets," Telecommunications Research Centre, Bradford University, 2005, pp. 27-30.

Singh, Rajender, "Broadband Planar Monopole Antennas," M.Tech credit seminar report, Electronic Systems group, EE Dept, IIT Bombay, Nov. 2003, pp. 1-24.

Wang, F., Z. Du, Q. Wang, and K. Gong, "Enhanced-bandwidth PIFA with T-shaped ground plane," Electronics Letters, vol. 40, 1504-1505, 2004.

Wang, H.; "Dual-Resonance Monopole Antenna with Tuning Stubs"; IEEE Proceedings, Microwaves, Antennas & Propagation, vol. 153, No. 4, Aug. 2006; pp. 395-399.

Wang, K., et al.; "A Low-Profile Planar Monopole Antenna for Multiband Operation of Mobile Handsets"; IEEE Transactions on Antennas and Propagation, Jan. '03, vol. 51, No. 1.

White, Carson, R., "Single- and Dual-Polarized Slot and Patch Antennas with Wide Tuning Ranges", The University of Michigan, 2008.

Wong, Kin-Lu, et al. "Planar Antennas for WLAN Applications," Dept. of Electrical Engineering, National Sun Yat-Sen University, Sep. 2002 Ansoft Workshop, pp. 1-45.

X.-D. Cal and J.-Y, Li, Analysis of asymmetric TEM cell and its optimum design of electric field.distribution, IEE Proc 136 (1989), 191-194.

X.-Q. Yang and K.-M, Huang, Study on the key problems of interaction between microwave and chemical reaction, Chin Jof Radio Sci 21 (2006), 802-809.

Zhang, Y.Q., et al. "Band-Notched UWB Crossed Semi-Ring Monopole Antenna," Progress in Electronics Research C, vol. 19, 107-118, 2011, pp. 107-118.

\* cited by examiner

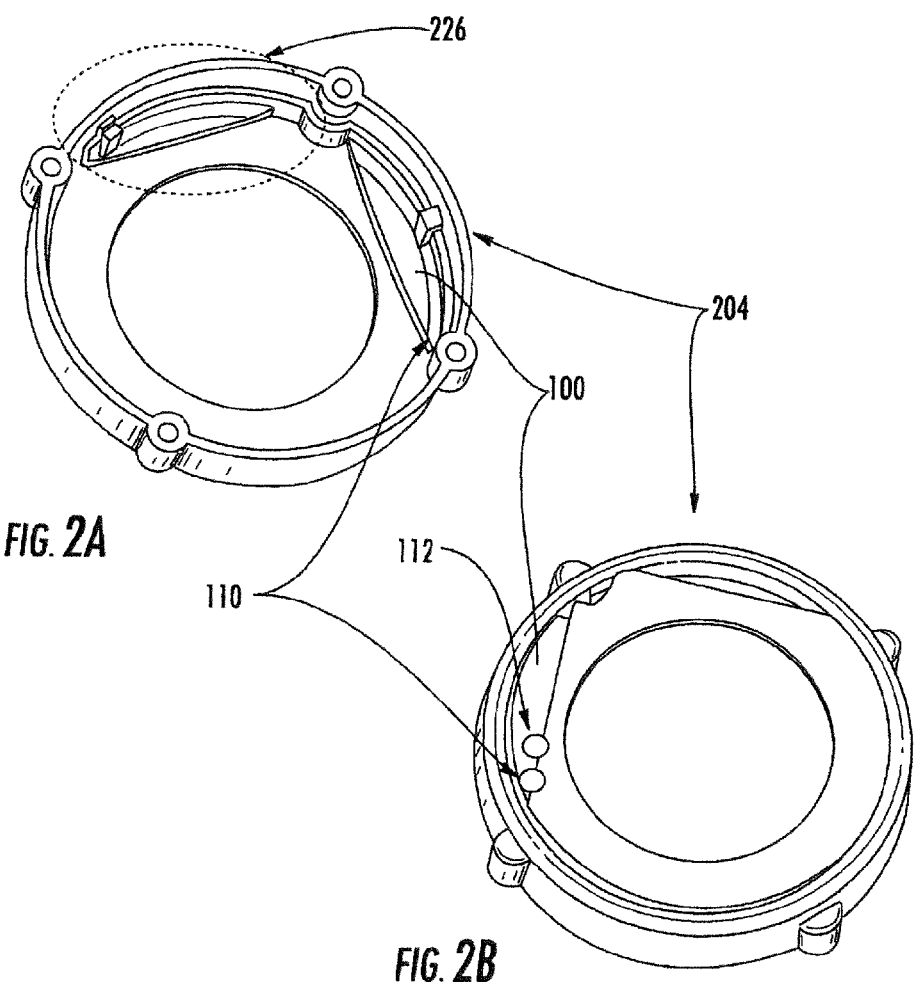

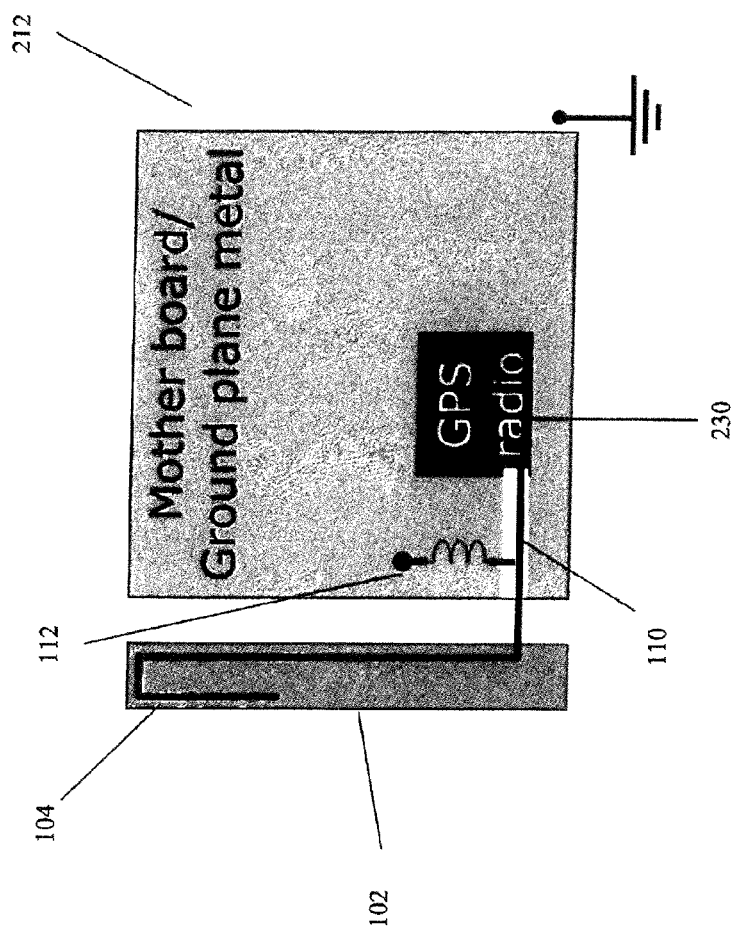

COMPACT POLARIZED ANTENNA AND METHODS

PRIORITY

This application is a divisional of and claims priority to co-owned and co-pending U.S. patent application Ser. No. 13/439,576 of the same title, filed Apr. 4, 2012, the contents of which is being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field Of The Invention

The present invention relates generally to antenna apparatus for use in electronic devices such as wireless or portable radio devices, and more particularly in one exemplary aspect to a chassis-excited antenna, and methods of tuning and utilizing the same.

2. Description Of Related Technology

Internal antennas are commonly found in most modern radio devices, such as mobile computers, portable navigation devices, mobile phones, smartphones, personal digital assistants (PDAs), or other personal communication devices (PCD). Typically, these antennas comprise a planar radiating plane and a ground plane parallel thereto, which are connected to each other by a short-circuit conductor in order to achieve the matching of the antenna. The structure is configured so that it functions as a resonator at the desired operating frequency. It is also a common requirement that the antenna operate in more than one frequency band (such as dual-band, tri-band, or quad-band mobile phones), in which case two or more resonators are used. Typically, these internal antennas are located on a printed circuit board (PCB) of the radio device, inside a plastic enclosure that permits propagation of radio frequency waves to and from the antenna(s).

In addition, in order to maximize the transmit power transfer between the transmit antenna and the receive antenna, the antennas should implement the same antenna polarization. A miss-match in antenna polarization will result in signal loss thereby reducing performance of the receiver antenna. Right-handed circular polarization (RHCP) is used in satellite navigation systems, such as Global Positioning System (GPS) and the Global Navigation Satellite System (GLONASS). Current implementations of RCHP receiving antennas used in satellite navigation receivers typically include half-wave patch antennas. Half-wave patch antennas are relatively large in size, and thus limit the possibility of minimizing the end device's physical size and designing a favorable form factor.

The use of high dielectric materials has been used to reduce the physical dimensions of the patch antenna, however at the cost of reducing the impedance bandwidth of the antenna, thereby making the antenna more susceptible to surrounding detuning effects. Moreover, such high dielectric materials often have significant weight associated therewith, which can be undesirable for small form factor devices.

Furthermore, patch antennas have narrow impedance and radiation bandwidth characteristics thus limiting the operating frequency range.

Quarter-wave antennas are typically used in applications with space constraints, such as mobile telephones. However, quarter-wavelength antennas mainly operate inherently in a linear polarized mode, thereby causing polarization mismatch and signal loss when receiving circularly polarized signals. In addition, while operating in a linear polarized mode, the RHCP and left-handed circular polarization (LHCP) gain are approximately the same magnitude. Therefore, in system operating using RHCP signals, such as GPS, the strong receipt of LHCP signals by the receiver reduces the receiver's sensitivity. Accordingly, the reduced sensitivity of the receiver, such as in the case of GPS applications, results in poor positioning accuracy. Furthermore, small antenna solutions (e.g. chip antenna, trace antenna, helix antenna, etc) are commonly linearly polarized and not optimized to suppress unwanted polarization signals.

Accordingly, there is a salient need for a wireless antenna with an increased bandwidth and efficiency as well as reduced size for use in portable devices utilizing circular polarized signals.

SUMMARY OF THE INVENTION

Various aspects of the present invention satisfy the foregoing needs by providing, inter alia, improved circularly polarized antenna apparatus and associated methods.

In a first aspect of the invention, an antenna component for use in a portable communications device is disclosed. In one embodiment, the device comprises a ground, a feed port, and a ground plane, and the component includes: a dielectric substrate; a radiator element disposed proximate to a surface of the substrate; and a feed conductor configured to couple to the radiator at a feed point. The antenna component is configured to operate in a first mode when placed under a first operating condition, and to operate in a second mode when placed under a second operating condition.

In one variant, the first mode comprises operating as a linear polarized antenna, and the second mode comprises operating as a right hand circular polarized (RHCP) antenna. The first operating condition comprises the device operating in free-space, and the second operating condition comprises the device operating under a loading condition (e.g., being in electrical contact with at least a part of a user's body).

In another variant, the antenna component comprises a quarter-wave antenna.

In a second aspect of the invention, a small form factor portable device configured to provide positioning information to a user thereof is disclosed. In one embodiment, the device includes: an antenna capable of operating in a free-space mode and a non free-space mode; and positioning receiver circuitry capable of extracting data from received circularly polarized signals received via at least the non free-space mode of the antenna, the data useful in determining the position of the device.

In one variant, the device comprises a wristwatch-like form factor having a substantially planar face, and the antenna is disposed so as to provide maximal sensitivity in a direction substantially normal to the planar face.

In another variant, the antenna comprises a quarter-wave antenna, thereby allowing the device form factor to be smaller than it would otherwise without use of the quarter wave antenna.

In yet another variant, the antenna includes no high-dielectric (high Epsilon) materials.

In a further variant, the free-space mode comprises a mode wherein the device is not in direct contact with a user thereof, and the non free-space mode comprises a mode wherein the device is loaded by at least contact of the device with bodily tissue of the user.

In still another variant, the antenna includes a substantially polymeric three-dimensional base member and at least one layer of conductive material disposed over prescribed portions of a surface thereof. The at least one layer of conductive material is formed using e.g., a laser direct structuring (LDS) technique.

In a third aspect of the invention, a quarter-wave antenna apparatus for use in small form factor portable electronic device applications is disclosed. In one embodiment, the apparatus is formed by the method comprising: providing a three-dimensional polymer-based structure; applying at least one layer of conductive material to selected regions of a surface of the structure so as to produce a quarter-wave radiator, portions of the selected regions corresponding to a feed and a ground for the radiator. Placement of the feed portion and ground portion are selected so as produce desired right-handed circular polarization (RHCP) and left-handed circular polarization (LHCP) isolation gains.

In one variant, the placement of the feed portion and ground portion are selected so as produce desired right-handed circular polarization (RHCP) and left-handed circular polarization (LHCP) isolation gains is selected so as to provide an RHCP isolation gain which is substantially greater than an LHCP isolation gain.

In another variant, the three-dimensional polymer-based structure includes a substantially arcuate shape.

In a further variant, the applying at least one layer of conductive material to selected regions of a surface of the structure comprises use of a laser direct structuring process.

In still another variant, the applying at least one layer of conductive material to selected regions of a surface of the structure comprises use of a printing process using flowable conductive material, and without any plating process.

In a fourth aspect of the invention, a method of tuning an antenna so as to optimize the relationship of a first polarization and a second polarization is disclosed. In one embodiment, the antenna comprise a layer of conductive material disposed on a three-dimensional substrate, and the method includes selecting the position of at least one of a feed trace and a ground trace on the three-dimensional substrate so as to control an isolation gain for the first polarization relative to the second polarization.

In one variant, the first polarization comprises a right-handed circular polarization (RHCP) and the second polarization comprises a left-handed circular polarization (LHCP).

In another variant, the method further includes adjusting a relative positional relationship of the feed trace and ground trace so as to achieve a desired input impedance for the antenna.

In a fifth aspect of the invention, a method of tuning an antenna so as to optimise an input impedance thereof is disclosed. In one embodiment, the antenna comprises a layer of conductive material disposed on a three-dimensional substrate, and the method includes selecting the position of at least one of a feed trace and a ground trace on the three-dimensional substrate so as to control the input impedance.

Further features of the present invention, its nature and various advantages will be more apparent from the accompanying drawings and the following detailed description.

BRIEF DESCRIPTION OF THE DRAWINGS

The features, objectives, and advantages of the invention will become more apparent from the detailed description set forth below when taken in conjunction with the drawings, wherein:

FIGS. 2A and 2B are isometric views of underside and top side, respectively, of the top cover of the exemplary portable device of FIG. 2 with exemplary antenna according to the present invention.

FIG. 2D is a schematic block diagram illustrating one embodiment of the electrical layout of the exemplary device of FIG. 2.

Figure 1A:
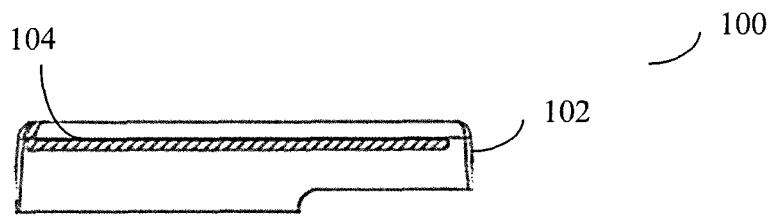
FIG. 1A is a side elevation view illustrating the outside wall of an exemplary embodiment of an antenna apparatus according to the present invention.

All Figures disclosed herein are ® Copyright 2012 Pulse Finland Oy. All rights reserved.

DETAILED DESCRIPTION OF THE PREFERRED EMBODIMENT

Reference is now made to the drawings wherein like numerals refer to like parts throughout.

As used herein, the terms "antenna," "antenna system," "antenna assembly", and "multi-band antenna" refer without limitation to any system that incorporates a single element, multiple elements, or one or more arrays of elements that receive/transmit and/or propagate one or more frequency bands of electromagnetic radiation. The radiation may be of numerous types, e.g., microwave, millimeter wave, radio frequency, digital modulated, analog, analog/digital encoded, digitally encoded millimeter wave energy, or the like. The energy may be transmitted from location to another location, using, or more repeater links, and one or more locations may be mobile, stationary, or fixed to a location on earth such as a base station.

As used herein, the terms "board" and "substrate" refer generally and without limitation to any substantially planar or curved surface or component upon which other components can be disposed. For example, a substrate may comprise a single or multi-layered printed circuit board (e.g., FR4), a semi-conductive die or wafer, or even a surface of a housing or other device component, and may be substantially rigid or alternatively at least somewhat flexible.

The terms "frequency range", "frequency band", and "frequency domain" refer without limitation to any frequency range for communicating signals. Such signals may be communicated pursuant to one or more standards or wireless air interfaces.

As used herein, the terms "portable device", "mobile device", "client device", "computing device", and "end user device" include, but are not limited to, personal computers (PCs) and minicomputers, whether desktop, laptop, or otherwise, set-top boxes, personal digital assistants (PDAs), handheld computers, personal communicators, tablet computers, portable navigation aids, J2ME equipped devices, cellular telephones, smartphones, tablet computers, personal integrated communication or entertainment devices, portable navigation devices, or literally any other device capable of processing data.

Furthermore, as used herein, the terms "radiator," "radiating plane," and "radiating element" refer without limitation to an element that can function as part of a system that receives and/or transmits radio-frequency electromagnetic radiation; e.g., an antenna.

The terms "RF feed," "feed," "feed conductor," and "feed network" refer without limitation to any energy conductor and coupling element(s) that can transfer energy, transform impedance, enhance performance characteristics, and conform impedance properties between an incoming/outgoing RF energy signals to that of one or more connective elements, such as for example a radiator.

As used herein, the terms "top", "bottom", "side", "up", "down", "left", "right", and the like merely connote a relative position or geometry of one component to another, and in no way connote an absolute frame of reference or any required orientation. For example, a "top" portion of a component may actually reside below a "bottom" portion when the component is mounted to another device (e.g., to the underside of a PCB).

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, CDPD, satellite systems such as GPS and GLONASS, and millimeter wave or microwave systems.

Overview

The present invention provides, in one salient aspect, an antenna apparatus for use in a portable radio device which advantageously provides reduced size and cost, and improved antenna performance. In one embodiment, the portable radio device includes micro strip quarter-wave antenna for use with circular polarized signals. Quarter-wave antennas typically operate mostly in a linear polarized fashion and thus would receive RHCP and LHCP signals at approximately the same gain.

In one implementation, the antenna apparatus is designed to be used with a wrist-mountable watch device enabled with a satellite navigation system (e.g. GPS and/or GLO-NASS). Satellite navigation systems implement RHCP transmission signals. When the device is operated in free-space (i.e. not attached to a user), the (quarter-wave) antenna operates primarily in a linear polarized mode. However, when the device is attached to a user (e.g. disposed on the user's wrist, and hence loaded by a user's body tissue), the antenna is designed to operate in a dominant RHCP mode by suppressing reception of LHCP signals. This configuration allows for efficient space utilization of a small form factor antenna (e.g. a quarter-wave antenna) to utilize a circular polarization mode.

Advantageously, exemplary embodiments of the invention also obviate the use of high-dielectric materials as in the prior art, thereby allowing for further reductions in device form factor and weight.

Moreover, the inventive antenna configuration allows for the antenna radiators to be positioned within the host device (e.g., watch, mobile computing device, etc.) in such a manner as to optimize the received satellite signal for the expected use cases (e.g., typically pointing upwards toward the sky for wrist watch implementations).

The antenna configuration as in the illustrated embodiments described herein allows for optimization of antenna operation during a normal operating condition (such as being as being in physical contact with the user), as well as providing good performance when the device is not in contact with the user. Furthermore, the use of quarter-wave micro-strip antenna structure in certain embodiments reduces antenna size, which in turn allows for thinner and lighter portable communication devices. Such, a reduction in thickness can be a critical attribute for a portable device and its commercial popularity.

DETAILED DESCRIPTION OF EXEMPLARY EMBODIMENTS

Detailed descriptions of the various embodiments and variants of the apparatus and methods of the invention are now provided. While primarily discussed in the context of mobile devices, the various apparatus and methodologies discussed herein are not so limited. In fact, many of the apparatus and methodologies described herein are useful in any number of complex antennas, whether associated with mobile or fixed devices that can benefit from the RHCP antenna and methodologies described herein.

Exemplary Antenna Apparatus

Referring now to FIGS. 1A-1D, exemplary embodiments of the radio antenna apparatus of the invention are described in detail.

In the illustrated implementation, antenna apparatus 100 includes a quarter-wave micro-strip antenna. One salient advantage of the use of a quarter-wave antenna is its reduced size. Therefore, the use of high dielectric materials is not required to reduce the physical size of the antenna in order to be usable in highly space-constrained applications. Moreover, while the use high dielectric allows for a reduction of antenna size, the antenna's frequency and impedance bandwidths are reduced, thereby negatively impacting the antenna's performance range. Accordingly, by mitigating the need of high dielectric materials in space constrained antenna applications, the illustrated antenna maintains high electrical performance, small form factor, and lower weight.

In one implementation, the antenna apparatus 100 of FIGS. 1A-1D is formed from using a metal covered plastic body, fabricated by any suitable manufacturing method (such as, for example laser direct structuring (LDS), discussed in greater detail below). However, other implementations may be used to manufacture the antenna apparatus 100 such as flex printed circuit board (PCB), sheet metal, printed radiators, etc., consistent with maintaining the desired small form factor and other attributes provided by the exemplary LDS solution. For example, in one variant, the printing-based methods and apparatus described in co-owned and co-pending U.S. provisional patent application Ser. Nos. 61/606,320 filed Mar. 2, 2012, and 61/609,868 filed Mar. 12, 2012, each entitled "DEPOSITION ANTENNA APPARATUS AND METHODS", each incorporated herein by reference in its entirety, are used for deposition of the antenna radiator on the substrate. In one such variant, the antenna radiator includes a quarter-wave loop or wire-like structure printed onto the substrate using the aforementioned printing process.

Recent advances in LDS antenna manufacturing processes have enabled the construction of antennas directly onto the surface of a material (e.g., thermoplastic material that is doped with a metal additive). The doped metal additive is activated by means of a laser. LDS enables the construction of antennas onto more complex 3-dimensional geometries. In various typical smartphone and other mobile device applications application, the underlying device housing, and/or other components which the antenna may be disposed on inside the device, may be manufactured using this material, such as for example using standard injection molding processes. A laser is then used to activate areas of the (thermoplastic) material that are to be subsequently plated. Typically an electrolytic copper bath followed by successive additive layers such as nickel or gold are then added to complete the construction of the antenna.

LDS is able to produce cost- and space-efficient antennas on three-dimensional structures, such as the formed plastic body component 102 shown in FIGS. 1A-1D.

Referring to FIG. 1A, a side view of the antenna apparatus 100 is shown. The antenna body 102 comprises formed (e.g., injection or transfer molded) plastic, such as polycarbonate or acrylonitrile butadiene styrene (ABS). The formed plastic allows the antenna body 102 to be molded into a variety of shapes, and allows the use of a multitude of different form factors. The antenna radiator element 104 is formed onto of the antenna body 102 via traces of metalized plastic using e.g., the aforementioned LDS process. The antenna radiator element 104 is fed by one or more feed lines 106. In one exemplary variant, the antenna radiator element 104 is connected to a ground line 108. The placement of the ground line determines in part the resonant frequency of the antenna apparatus 100. The ground line may be directly coupled to the antenna element 104, or may be otherwise (e.g., inductively) coupled to the feed line at the host device.

The radiator element width and height are selected based on a specific antenna design requirements including frequency band, bandwidth, and efficiency, which can be readily obtained by one of ordinary skill given the present disclosure. In the illustrated embodiment, the antenna is structured to operate in accordance with extant GPS frequency bands and related parameters, although other applications are readily envisaged.

The placement of the feed line 106 and ground line 108 greatly affect the right-handed circular polarization (RHCP) and left-handed circular polarization (LHCP) isolation gains. For example, in the exemplary illustration, the feed and ground line 106, 108 placements are chosen for the RCHP gain to dominate, and the LHCP gain to be suppressed (so as to, inter alia, enhance sensitivity to the aforementioned GPS circularly polarized signals). However, if the feed and ground lines placements were located on the opposite end of the antenna body 102, the "handedness" of the antenna apparatus 100 would be reverse, thereby creating a dominant LHCP gain, while suppressing RHCP gain. Accordingly, while not illustrated, the present disclosure contemplates: (i) portable or other devices having both RHCP-dominant and LHCP dominant antennas that can operate substantially independent of one another, and (ii) variants wherein the receiver can switch between the two, depending on the polarization of the signals being received.

In addition, the location of the feed and ground line 106, 108 has a direct effect on the input impedance of the antenna. For example, the closer the feed and ground lines 106, 108 are to one another, the lower the input impedance of the antenna apparatus 100. Accordingly, the input impedance increases as the feed and ground line 106, 108 are farther apart. Thus, the input impedance of the antenna apparatus 100 can advantageously be adjusted accordingly to performance requirements.

In one exemplary embodiment of the present invention, the antenna apparatus 100 is optimized so that when the device is operating in free space, the antenna is primarily operating as a linear polarized antenna. However, the design of antenna radiator element 104, and the placement in relation to the feed line 106 and ground line 108, are such that when the antenna is placed in a certain operating condition, LHCP gain will be suppressed, thereby allowing the dominant gain to be the RHCP gain (or vice versa, when alternate handedness is used). In one implementation, the LHCP is suppressed when the device is placed onto a user's body, for example the user's wrist. The antenna 100 is design such what when the device is under an increased loading effect (caused by the user's body tissue), the LHCP gain will be suppressed. In this implementation, the exemplary target isolation between the RHCP and LHCP signals is approximately between six (6) through ten (10) decibels (dB), thereby providing very strong differentiation of the signals, and hence making the device quite sensitive to the received signals.

Figure 1B:
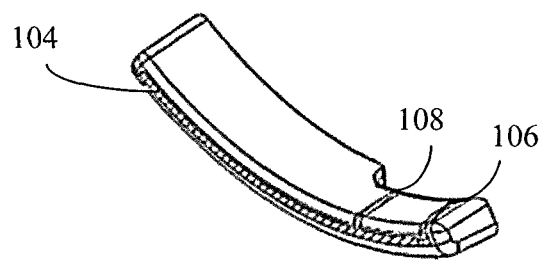
FIG. 1B is an isometric view illustrating the top and inside wall of the antenna apparatus according to FIG. 1A.

Referring now to FIG. 1B, the inside wall of the exemplary antenna apparatus 100 is shown. The feed line 106 and the ground line 108 are conductively connected to antenna radiator element 104 with lines 106, 108 running vertically along the inside wall of the antenna body 102.

Figure 1C:
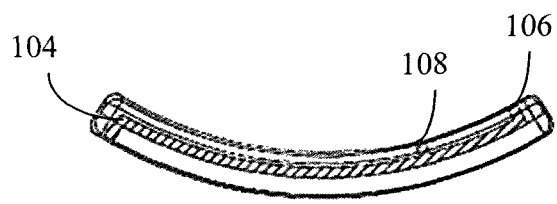
FIG. 1C is a top elevation view illustrating the top of the antenna apparatus according to FIG. 1A.

FIG. 1C illustrates a top view of the apparatus 100, illustrating the electrical connection between antenna radiator element 104 and feed line 106 and ground line 108.

Figure 1D:
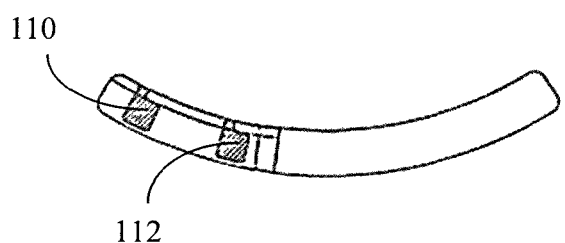
FIG. 1D is a bottom elevation view illustrating the bottom of the antenna apparatus according to FIG. 1A.

FIG. 1D is a view of the bottom surface of antenna apparatus 100. The feed line 104 and ground line 108 terminate to mounting pad contacts 110, 112 respectively. The mounting pad contacts 110, 112 are configured to surface mount to respective mounting pads of the mating device, for example a printed circuit board (PCB) 212—see FIG. 2. While the exemplary illustration implements surface mount contacts, other forms of contacts may be readily used (e.g. through-hole, etc.).

It will be appreciated that while these exemplary embodiments of the antenna apparatus of the invention are implemented using a micro-strip quarter wave antenna (selected in these embodiments for their desirable attributes and performance), the invention is in no way limited to the micro strip antenna configurations, and in fact can be implemented using other technologies, such as loop antennas.

Exemplary Mobile Device Configuration

Figure 2:
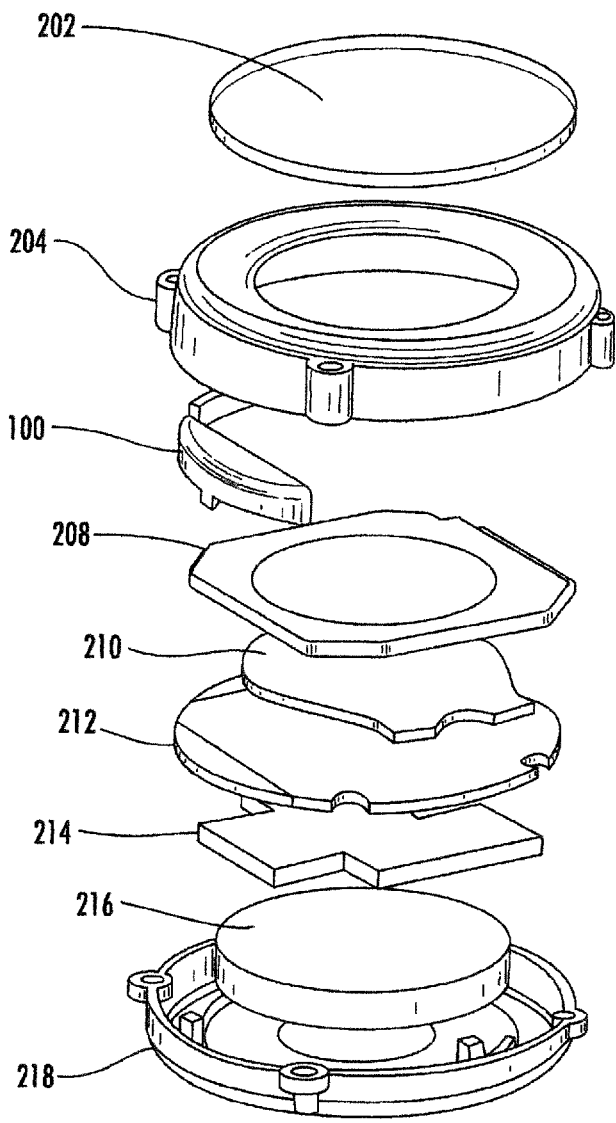
FIG. 2 is an exploded perspective view of an exemplary embodiment of a portable device utilizing an antenna apparatus of the type shown in FIGS. 1A-1D.

Referring now to FIGS. 2-2D, an exemplary embodiment of a portable device comprising antenna components configured in accordance with the principles of the present invention is shown and described.

As shown in FIG. 2, the portable device 200 of this embodiment comprises a wrist mountable watch with GPS functionality. The exemplary watch comprises an enclosure consisting of an upper cover or housing 204 and a lower cover or housing 214. In one implementation, the upper and lower covers 204, 214 are formed from a plastic material, such as injection molded polyethylene. In addition, the upper cover 204 is configured to receive a display cover 202 formed at least partly with a transparent material such as a transparent plastic or glass. The upper cover is also configured to receive the antenna apparatus 100 of FIGS. 1A-1D, as shown best in FIGS. 2A-2B. FIGS. 2A and 2B are bottom and top views, respectively, of the upper cover 204 with an inserted exemplary embodiment of the antenna apparatus 100, although it will be appreciated that other types and shapes of antenna structure may be substituted consistent with the device form factor and performance requirements. In one embodiment, the antenna apparatus 100 is included, as well as an additional antenna element 226. The other antenna element 226 can designed to receive other types of wireless signals, such as e.g., Bluetooth®, Bluetooth Low Energy (BLE), 802.11-based system, wireless Universal Serial Bus (USB), AM/FM radio, International, Scientific, Medical (ISM) band (e.g., ISM-868, ISM-915, etc), ZigBee®, etc. to expand the functionality of the portable device.

Referring back to FIG. 2, the portable device further comprises a display device 208. In one embodiment, the display is a liquid crystal display (LCD) and is used to display desired information to the user although, other display technologies can readily be implemented, such as light emitting diodes (LED) or organic LED (OLED), TFT (thin film transistor), etc. Moreover, the display device 208 and cover 202 can comprise a touch screen input and display device (e.g., capacitive or resistive) or the type well known in the electronic arts, thereby providing user touch input capability as well as display functionality.

Figure 2C:
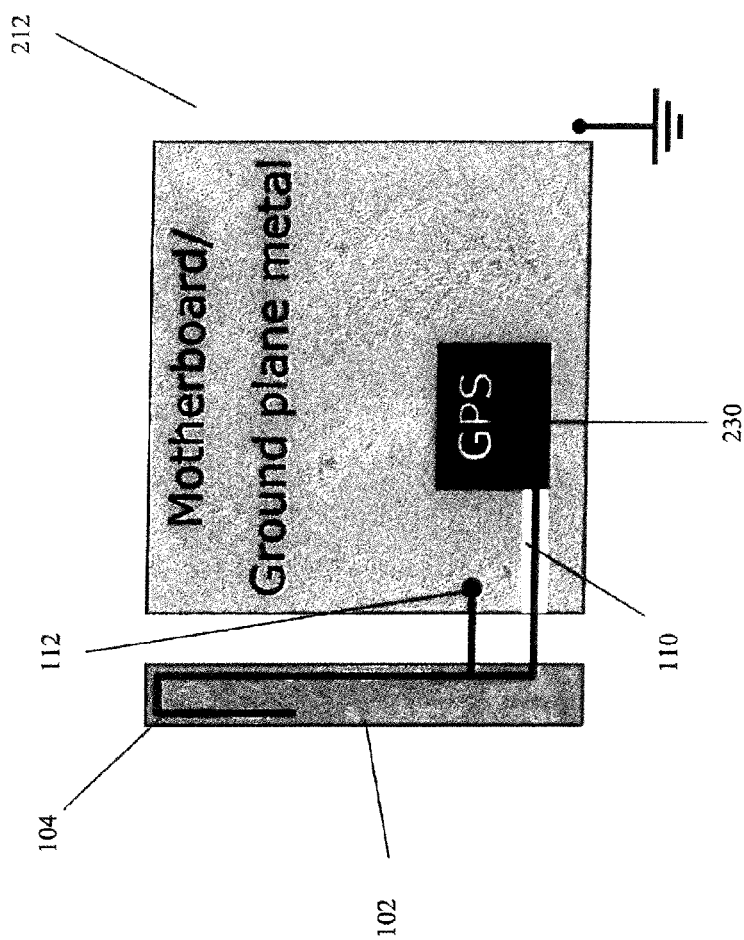
FIG. 2C is a schematic block diagram illustrating one embodiment of the electrical layout of the exemplary device of FIG. 2.

In the illustrated embodiment, the portable device 200 further comprises a plastic inner support frame 210 to support and separate the display from the printed circuit board (PCB) 212 of the device. The PCB 212 comprises the radio frequency receiver or transceiver electronics 230 (FIG. 2C), as well as any additionally desired electronics, and a ground plane for the antenna. FIG. 2D illustrates an exemplary embodiment where the ground mounting pad contact 112 is not directly connected to the antenna radiator element 104 at the antenna body 102. Rather, the ground mounting pad is inductively coupled to the feed mounting pad contact 110 at the PCB 212.

It will be recognized that the main beam or lobe direction of the antenna apparatus 100 shown in FIG. 2 can be affected by correctly selecting the placement of the antenna radiator 104 with respect to the ground plane of the PCB 212. Accordingly, in the present embodiment, the antenna apparatus is mounted on the left side of portable device 200. The radiation pattern with such an exemplary configuration has an RHCP main beam lobe directed to the opposite side of the device 200 (see FIG. 6A). Respectively, the LHCP main beam lobe is directed in the opposite direction of the RHCP main beam lode (see FIG. 6B).

Moreover, the axial ratio (AR) can be affected when antenna feed impedance is tuned in conjunction with user body tissue loading (see prior discussion of impedance tuning based on ground and fees trace locations). Axial ratio (AR) is an important parameter to define performance of circularly polarized antennas; an optimal axial ratio is one (1), which correlates to a condition where the amplitude of a rotating signal is equal in all phases. A fully linearly polarized antenna would have infinite axial ratio, meaning that its signal amplitude is reduced to zero when phase is rotated 90 degrees. If an optimal circular polarized signal is received with a fully linearly polarized antenna, 3 dB signal loss occurs due to polarization mismatch. In other words, 50% of the incident signal is lost. In practice, it is very difficult to achieve optimal circular polarization (AR=1) due to asymmetries on mechanical constructions, etc. Conventionally used ceramic GPS patch antennas typically have an axial ratio of 1 to 3 dB when used in actual implementations. This is considered to be "industry standard", and sufficient performance level.

The inventive antenna structure described herein achieves an axial ratio of about 5 dB to 7 dB due to limitations of controlling/modifying components of the host device mechanics. Some components such as ground plane size are fixed, and cannot be altered or used to optimize antenna performance. Exemplary embodiments of the inventive antenna described herein use a quarter-wave radiator, which is strongly coupled to the device ground plane.

In one implementation, the device 200 further comprises a metallic shield can 214, which resides underneath the PCB 212. This shield can 214 provides shielding of electronics residing on PCB 212. The shield can 214 behaves as part of the ground plane, and thus affects the ground plane size as well as the antenna shape. The device further comprises a battery 216 used to power the device. It will be appreciated that while a battery 216 is shown, other power sources may be used, whether alone or in tandem with the battery, including for example solar cells (e.g., disposed on or around the face of the device 200), and self-powering user movement-based systems (e.g., "Eco-Drive™ or the like).

Performance

Referring now to FIGS. 3 through 13, performance results obtained during testing by the Assignee hereof of an exemplary test antenna apparatus constructed according to the invention are presented.

Figure 3:
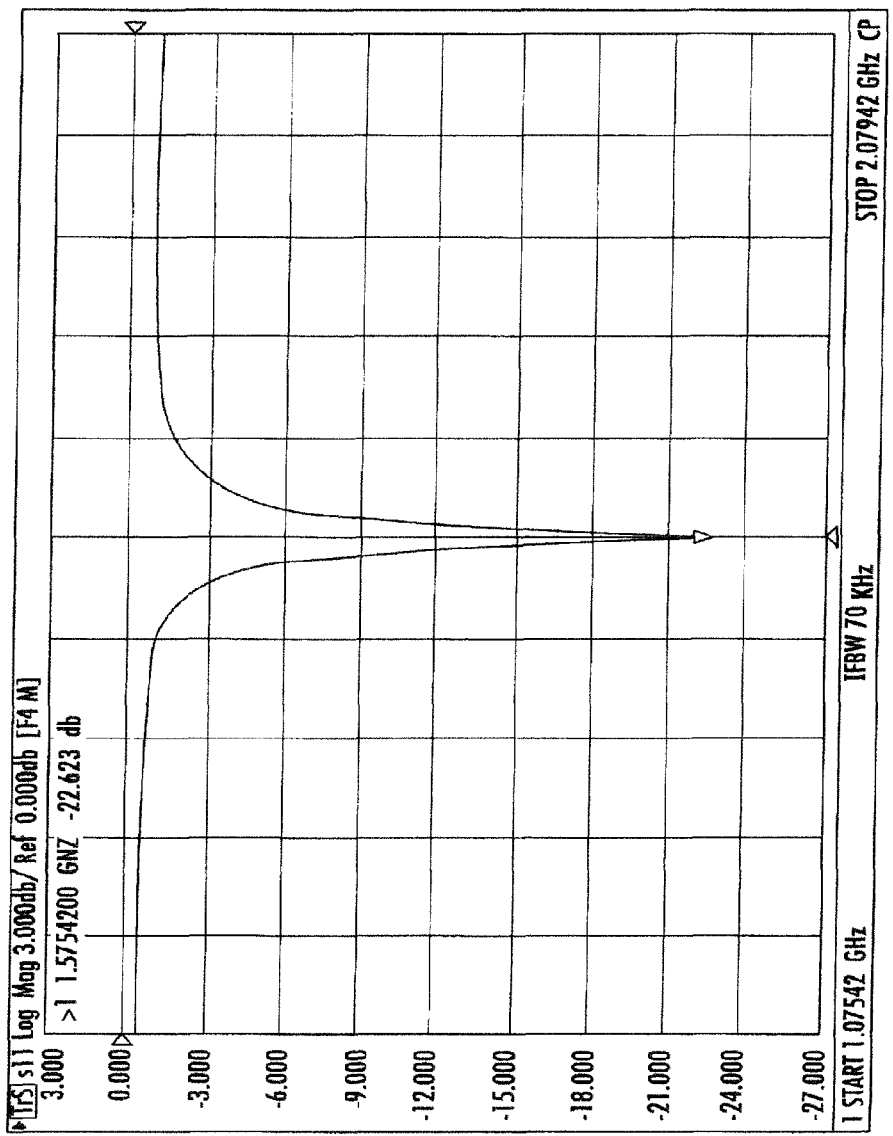
FIG. 3 is a plot of return loss S11 (in dB) as a function of frequency, measured at the wrist utilizing an exemplary antenna embodiment constructed in accordance with the antenna depicted in FIGS. 1A through 2C.

FIG. 3 shows a plot of return loss S11 (in dB) as a function of frequency, measured, while connected to a simulated wrist, utilizing an exemplary antenna apparatus 100 constructed in accordance with the embodiment depicted in FIGS. 1A through 2C. Exemplary data for the frequency band show a characteristic resonance structure at 1.575 GHz, with an intermediate frequency bandwidth (IFBW) of 70 kHz, thus producing an approximate frequency operating range of 1540-1610 MHz.

Figure 4:
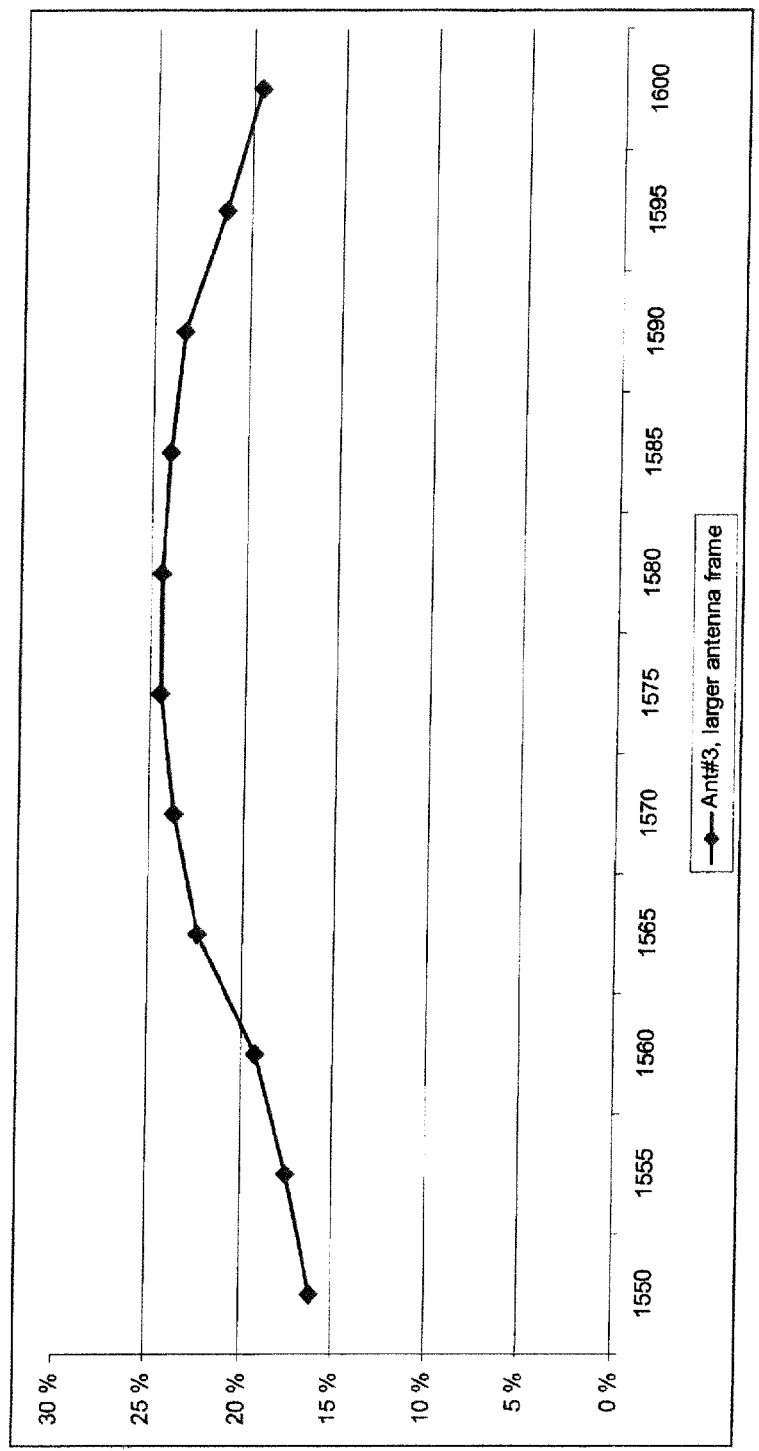
FIG. 4 is a plot of measured total efficiency measured at the wrist using an exemplary antenna embodiment of FIGS. 1A through 2C.

FIG. 4 presents data regarding efficiency (measured at the wrist) of a test setup emulating the exemplary antenna embodiment of FIGS. 1A-1D. The data in FIG. 4 demonstrates that the antenna of the invention positioned within the portable device and on the wrist of the user achieves an efficiency of greater than 15% over the exemplary frequency range between 1550 and 1605 MHz with the highest efficiency (about 24%) occurring at approximately 1575 MHz. The antenna efficiency (in percent) is defined as the percentage of a ratio of radiated and input power:

$$AntennaEfficiency\ \% = \left(\frac{\text{Radiated Power}}{\text{Input Power}}\right) \times 100\%  \quad \text{Eqn. (1)}$$

An efficiency of zero (0) dB corresponds to an ideal theoretical radiator, wherein all of the input power is radiated in the form of electromagnetic energy. Furthermore, according to reciprocity, the efficiency when used as a receive antenna is identical to the efficiency described in Equation 1. Thus, the transmit antenna efficiency is indicative of the expected sensitivity of the antenna operating in a receive mode.

The exemplary antenna of FIGS. 1A-1D is configured to operate in an exemplary frequency band from 1550 MHz to 1600 MHz. This capability advantageously allows operation of a portable computing device with a single antenna over several mobile frequency bands such as the GPS and GLONASS frequency bands. As persons skilled in the art appreciate, the frequency band composition given above may be modified as required by the particular application(s) desired, and additional bands may be supported/used as well.

Figure 5:
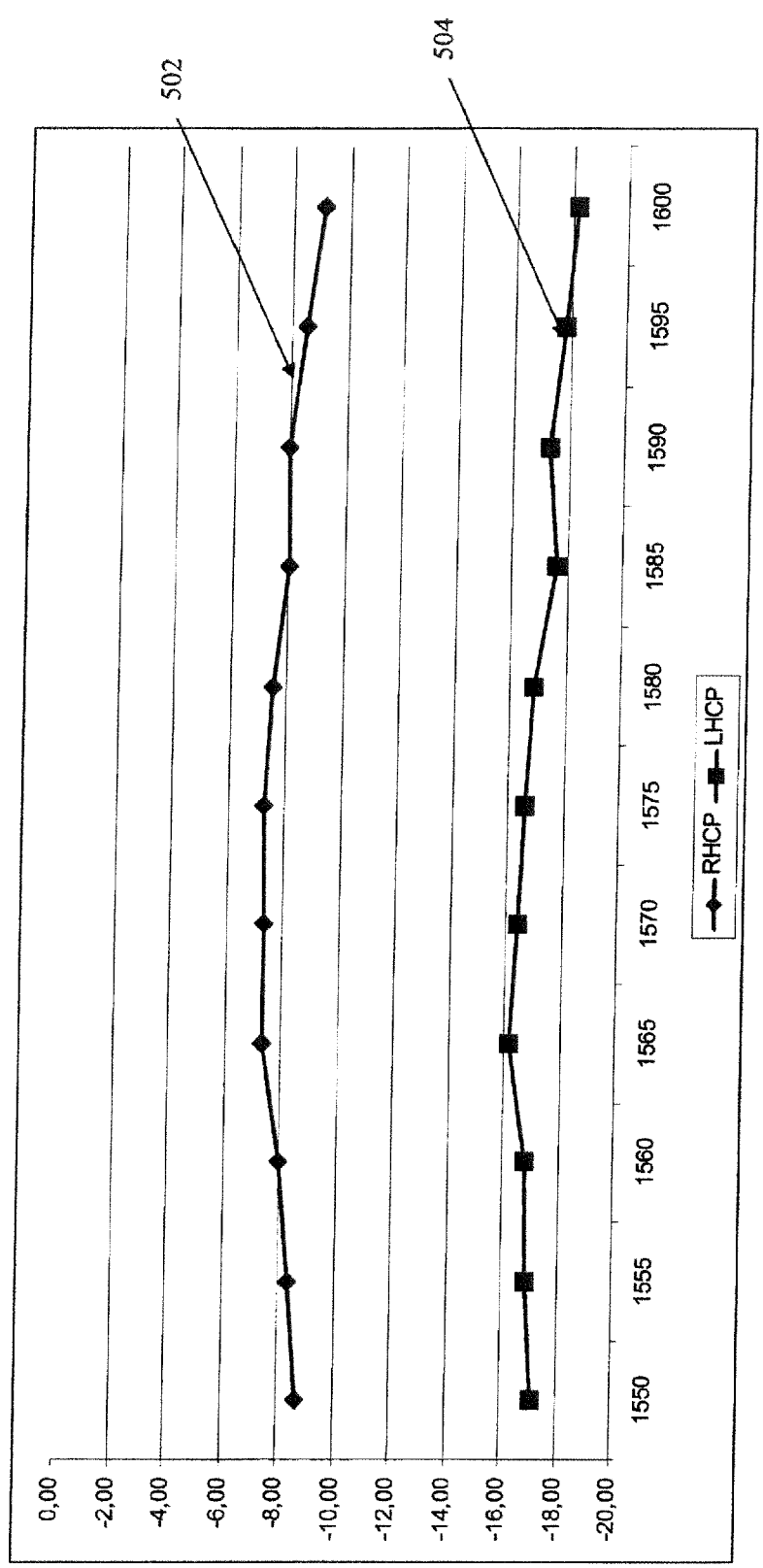
FIG. 5 is a plot of right hand circular polarized (RHCP) signal gain and left hand circular polarized (LHCP) signal gain as a function of frequency, measured with the antenna of FIGS. 1A through 2C disposed at zenith and on an artificial test wrist.

FIG. 5 illustrates exemplary LHCP and RHCP gain data for the test setup emulating the exemplary antenna of FIGS. 1A-1D herein. As illustrated, the RHCP gain 502 is appreciably higher than the LHCP gain 504, as desired in this application.

Figure 6A:
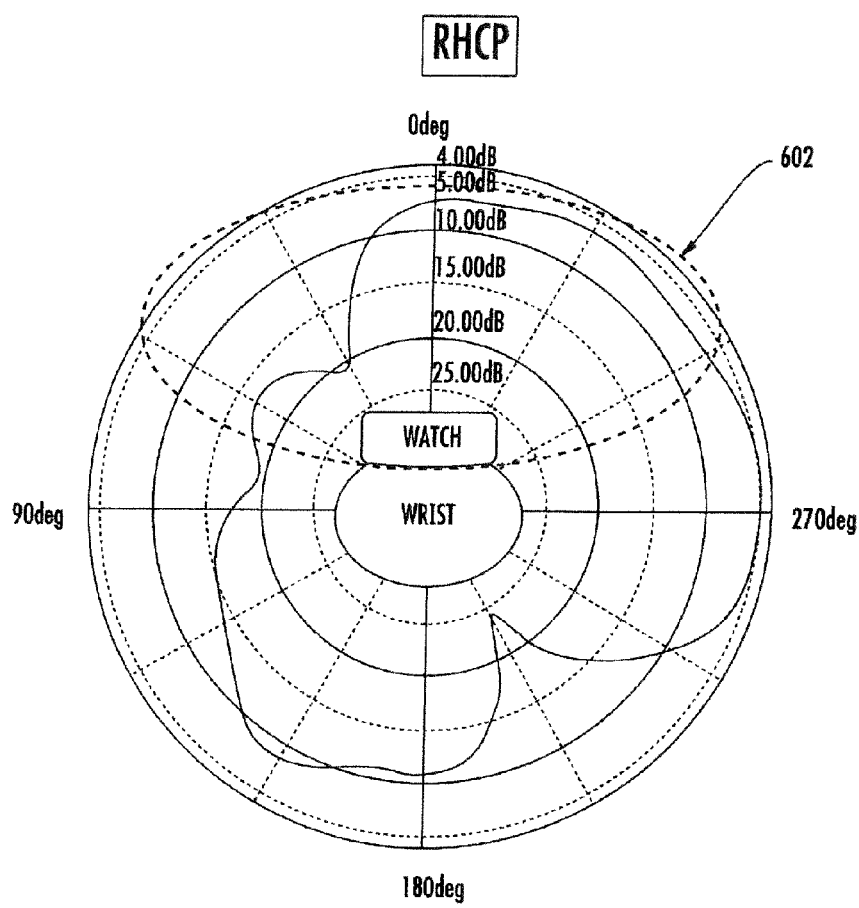
FIGS. 6A and 6B are polar plots illustrating exemplary directional LHCP and RHCP gain data for the test setup emulating the exemplary antenna of FIGS. 1A-1D herein, measured as to the zenith pointing upwards at ninety (90) degrees.
Figure 6B:
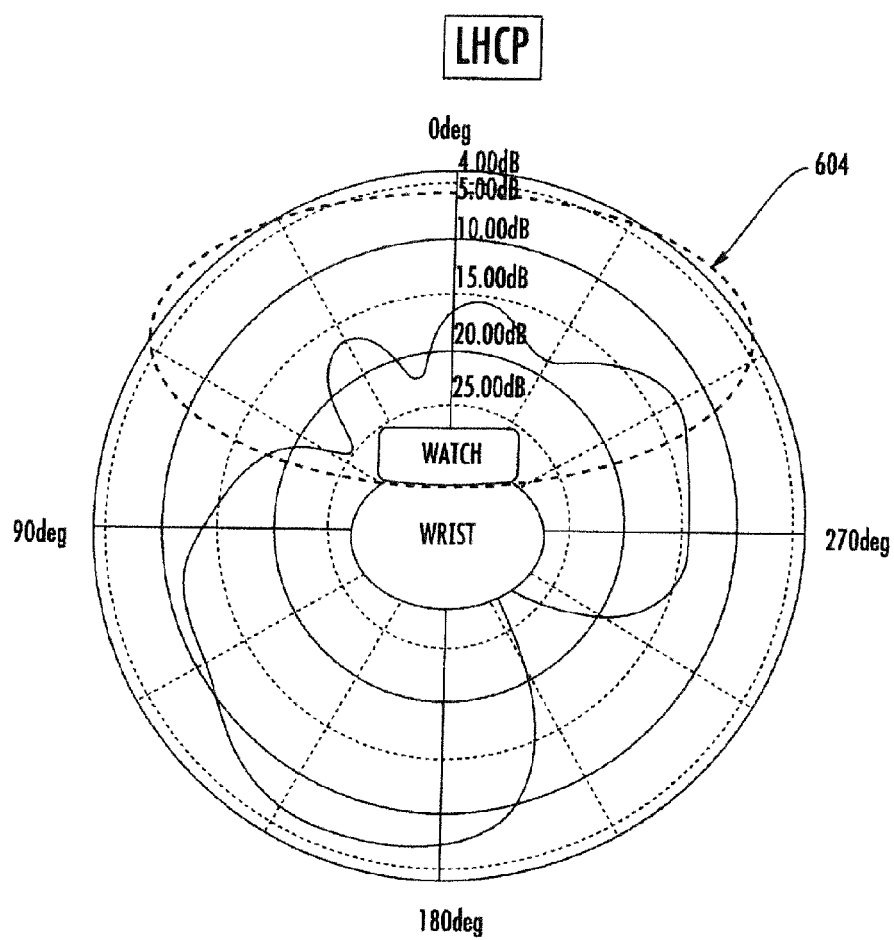

FIGS. 6A and 6B illustrate exemplary directional LHCP and RHCP gain data for the test setup emulating the exemplary antenna of FIGS. 1A-1D herein, measured as to the zenith pointing upwards at ninety (90) degrees from a plane parallel with the earth's surface; i.e., in the direction one might encounter GPS/GLONASS satellites if standing on the earth. As illustrated, the RHCP directional gain 602 is appreciably higher than the LHCP directional gain 604, as desired in this application. Accordingly, in satellite navigation system applications where signals would be transmitted downward to a user from orbiting satellites (i.e. around the zero degree direction on the plots of FIGS. 6A and 6B) the LHCP gain is suppressed while still allowing for dominating RHCP gain. Thus, by suppressing the LHCP gain compared to the RHCP gain, the receiver sensitivity to RHCP signals does not suffer from a high LHCP gain, thereby increasing positional accuracy in the exemplary case of satellite navigation applications.

FIGS. 7-11 illustrate exemplary passive test data for the test setup emulating the exemplary antenna of FIGS. 1A-1D herein.

Figure 7:
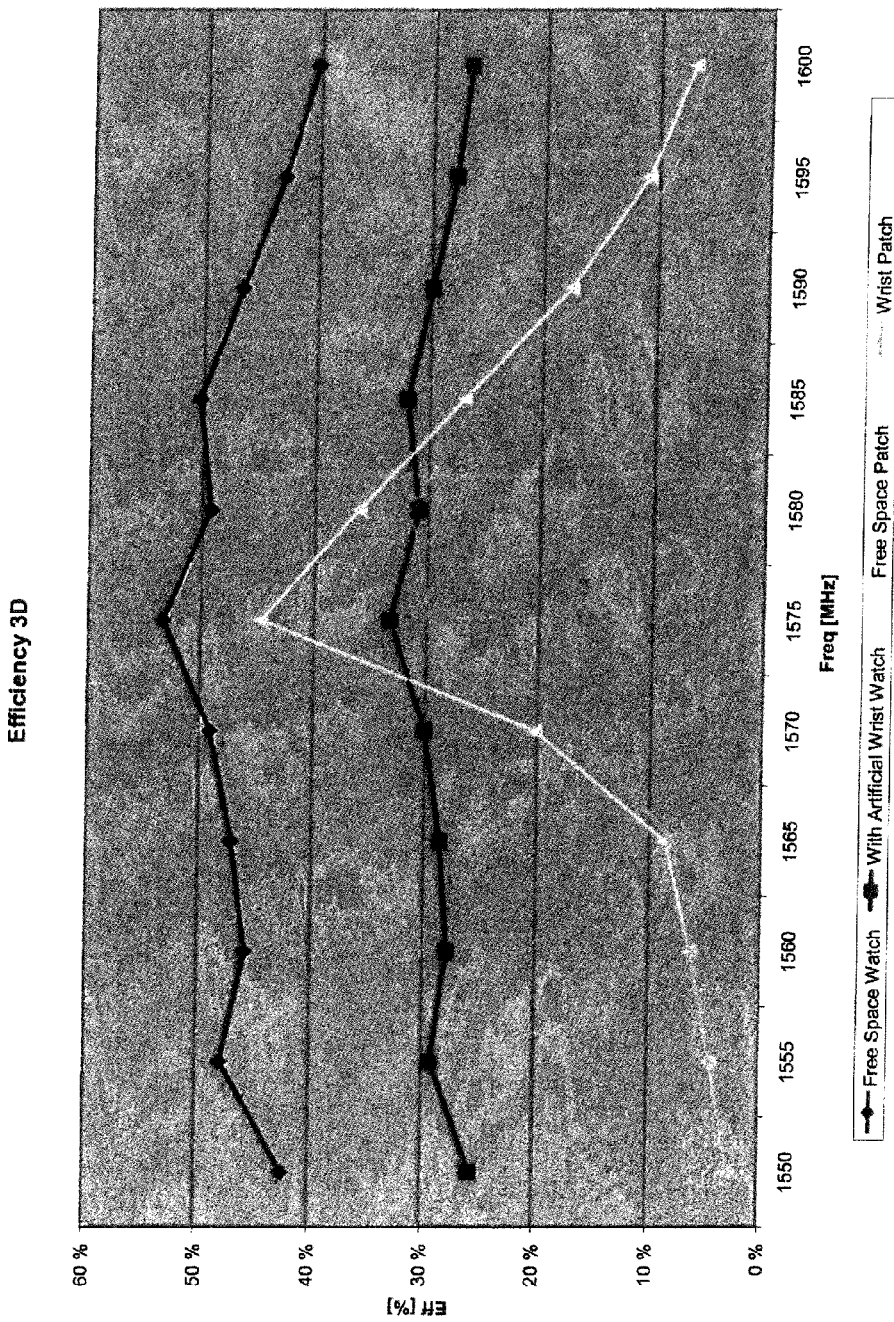
FIGS. 7-11 are graphs illustrating exemplary passive test data for a test setup emulating the exemplary antenna of FIGS. 1A-1D herein.

Specifically, as shown in FIG. 7, the inventive watch has better free-space efficiency (3D) than the reference patch antenna.

Figure 8:
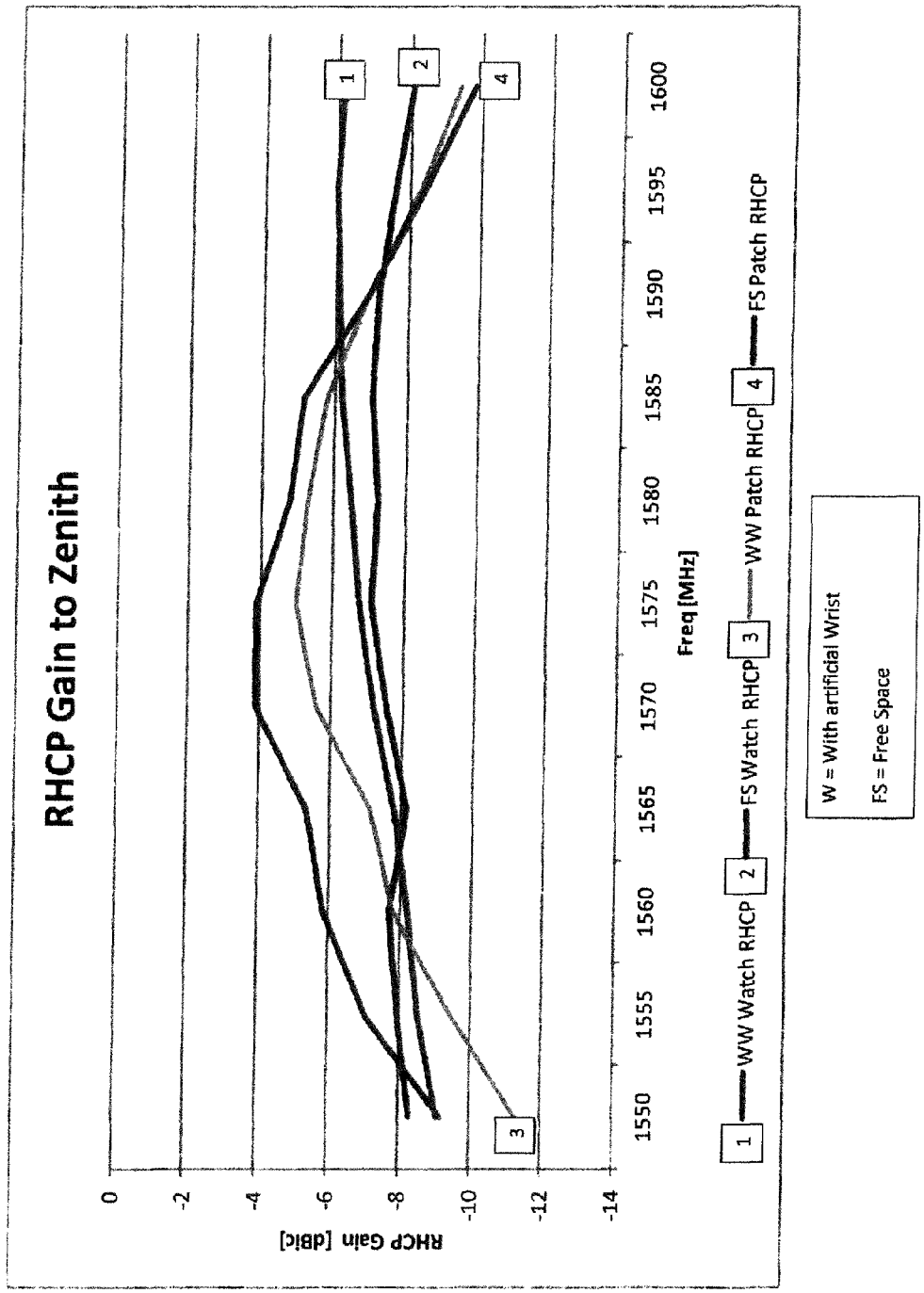

FIG. 8 illustrates that the free-space and wrist test data of RHCP gain (to zenith) in dBic for both the inventive watch and the reference patch are roughly comparable in the lower portion of the frequency band of interest, with the watch gain under both scenarios being appreciably higher above and below this region.

Figure 9:
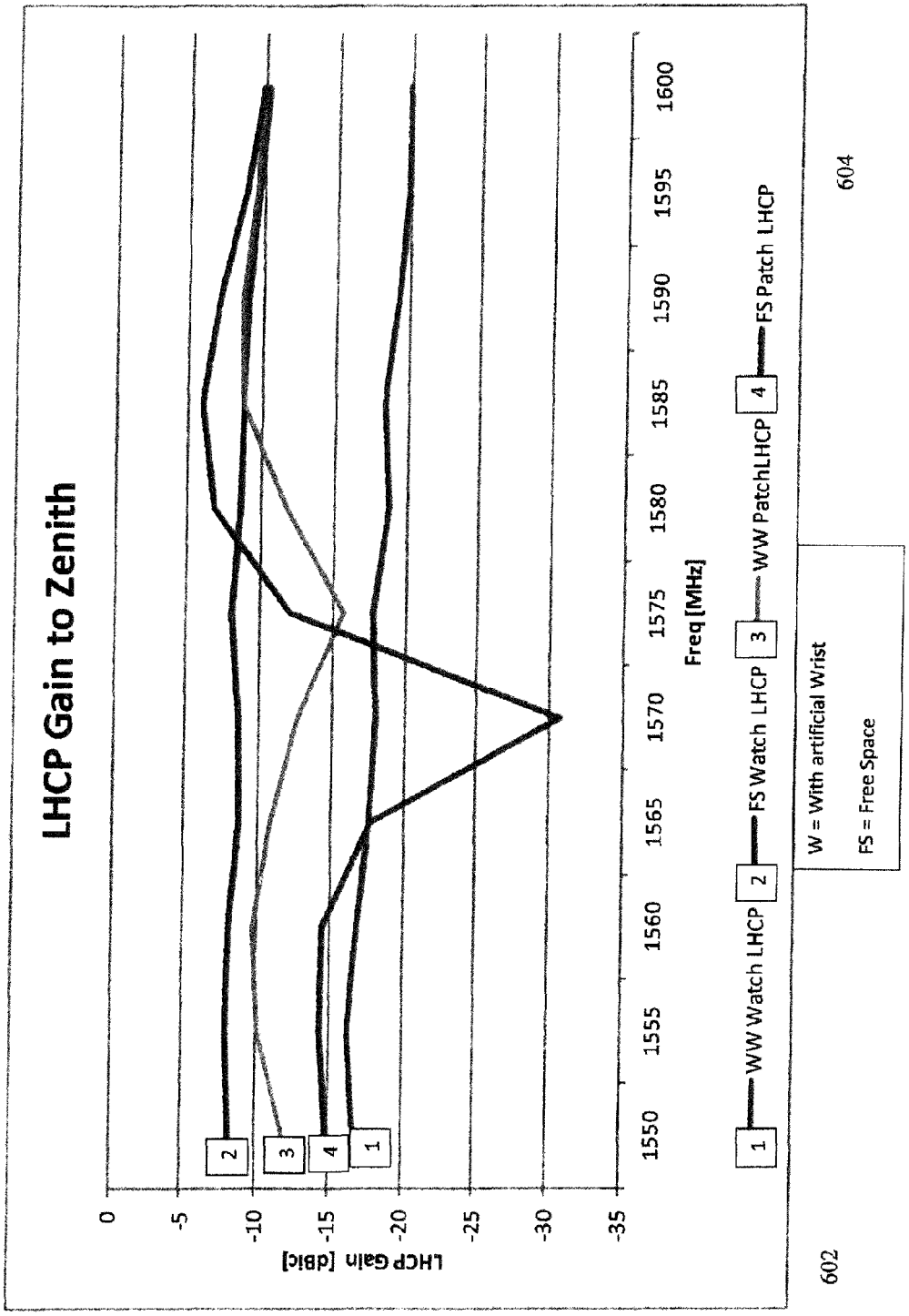

FIG. 9 illustrates that the free-space and wrist test data of LHCP gain (to zenith) in dBic for both the inventive watch and the reference patch are roughly comparable in the band of interest.

Figure 10:
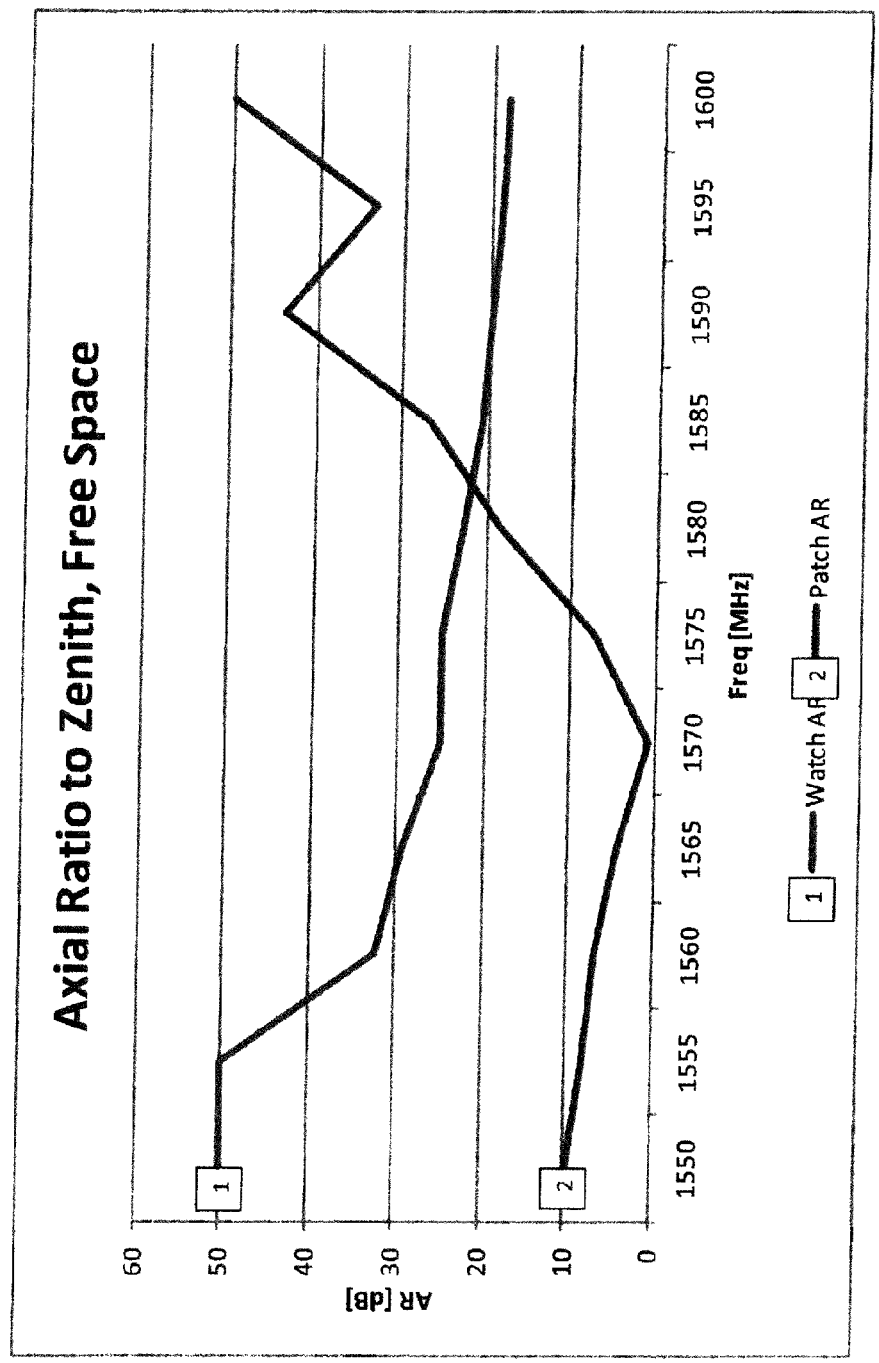

FIG. 10 illustrates the free-space test data of axial ratio (to zenith) in dB for both the inventive watch and the reference patch The reference patch antenna has an AR in free space of 1 dB@1570 MHz, and 5 dB@1575 MHz, which is a typical number in this kind of arrangement. The exemplary embodiment of the inventive watch has a 25 dB AR in free space, meaning that it is linearly polarized.

Figure 11:
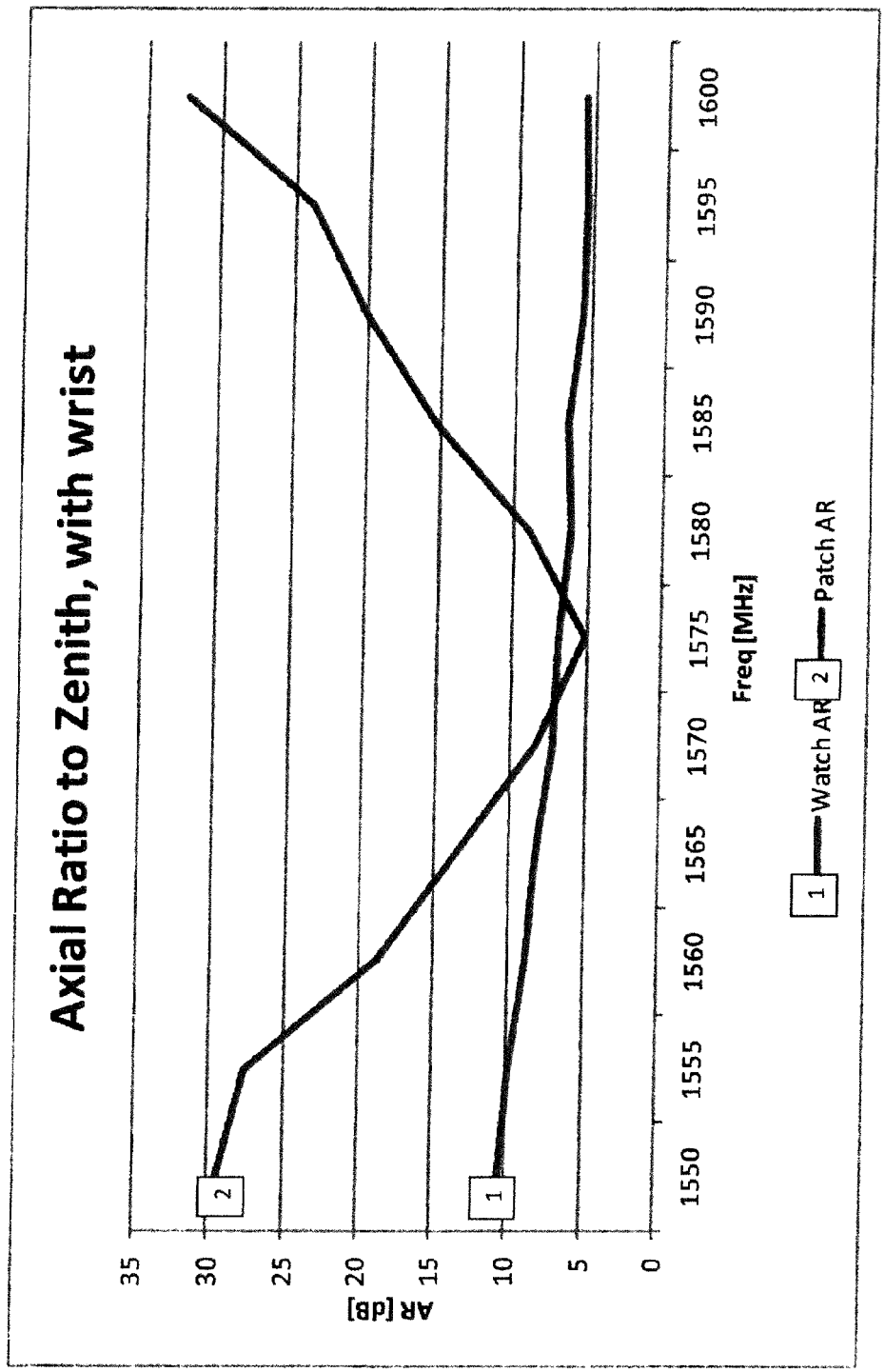

FIG. 11 illustrates the artificial wrist test data of axial ratio (to zenith) in dB for both the inventive watch and the reference patch As illustrated by the data, the reference patch antenna AR degrades when the antenna is measured with the wrist; the peak value is 5 dB compared to 1 dB in free space. The exemplary inventive watch AR improves from 25 dB (free space) to 7 dB (with wrist) on GPS frequency, and is about 5 dB in the GLONASS frequency range. This comparison shows that while the reference patch antenna performs better in free space, in this particular embodiment (measured with the wrist), the exemplary inventive watch reaches the same level of performance as the reference patch.

Hence, looking at the data provided in FIGS. 7-11 collectively, the inventive test watch efficiency was on the order of 10% better than that (patch) reference in free space, and with the artificial wrist, the efficiencies were roughly the same level in both cases.

Similarly, the reference (patch) RHCP gain was roughly comparable (1-2 dB better than the watch, but the RHCP/LHCP difference was advantageously higher in the watch).

Figure 12:
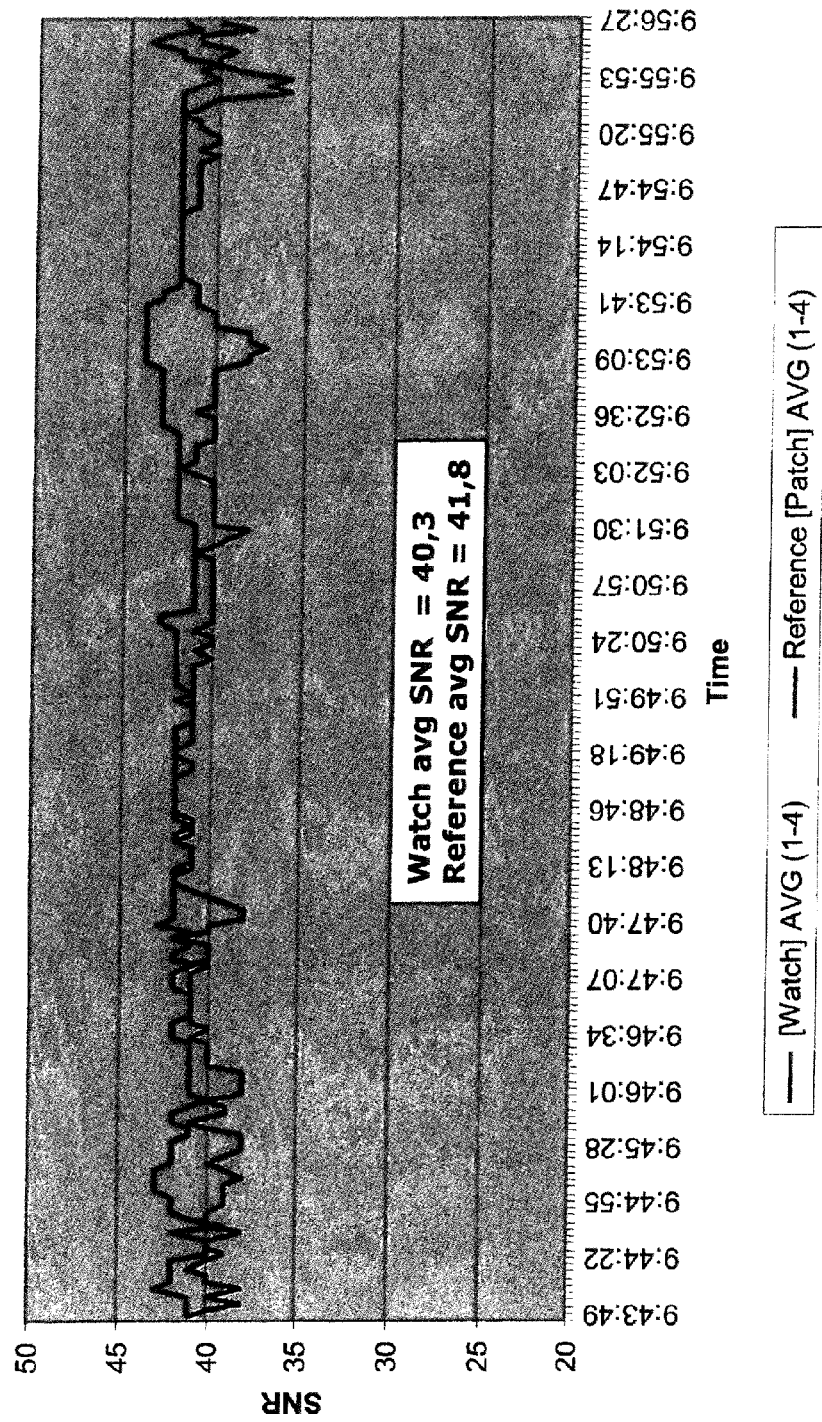
FIGS. 12 and 13 are graphs illustrating exemplary active test data relating to measured SNR (signal to noise ratio) for the four strongest values (FIG. 12) and the next four strongest values (FIG. 13) measured from an actual satellite (constellation).
Figure 13:
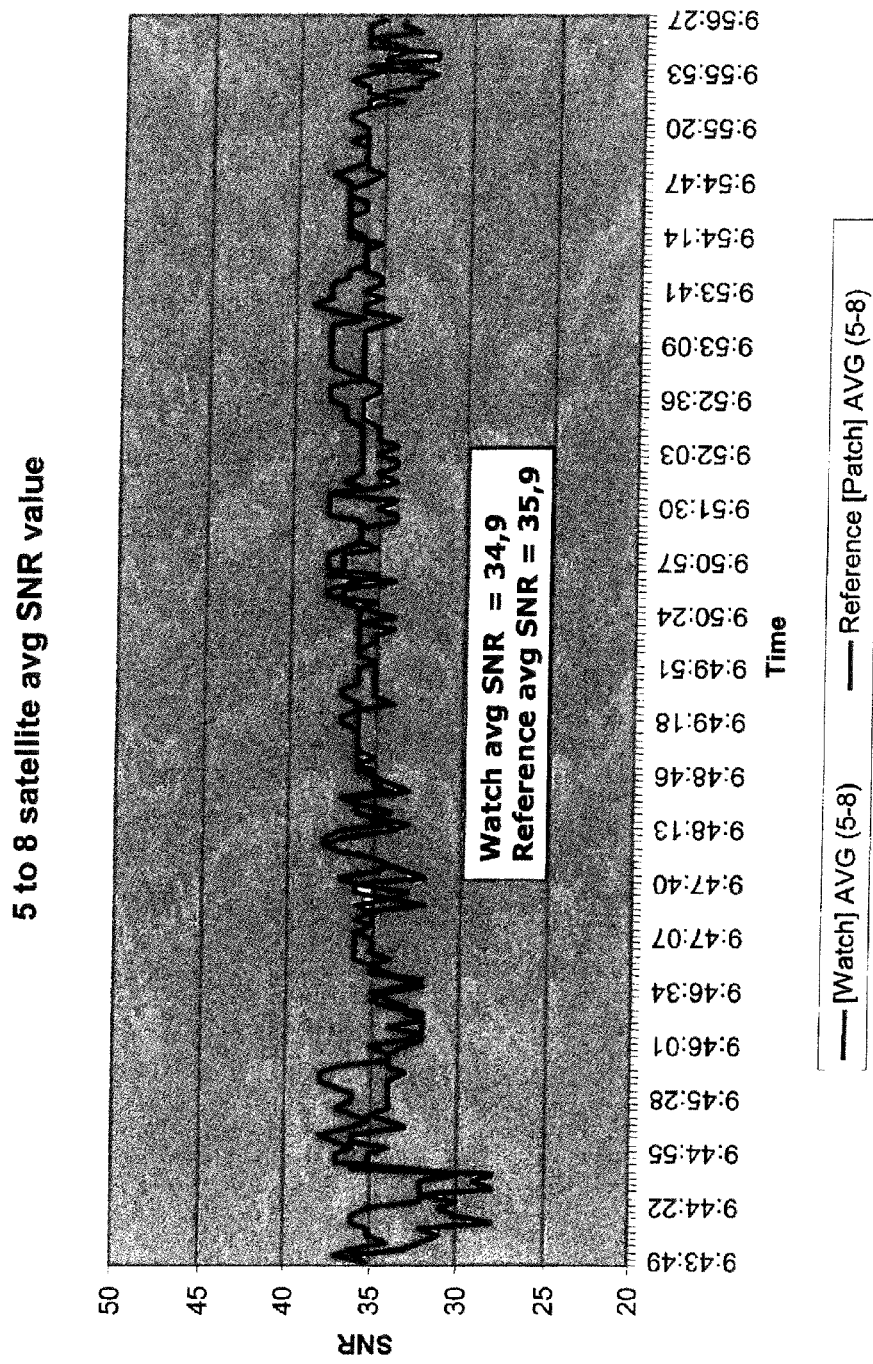

FIGS. 12 and 13 illustrate active test data relating to measured SNR (signal to noise ratio) for the four strongest values (FIG. 12) and the next four strongest values (FIG. 13) measured from an actual satellite (constellation). As illustrated, the data obtained from the inventive antenna apparatus and the reference (patch) antenna were generally comparable in SNR level.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An antenna component for use in a portable communications device, the device comprising a ground, a feed port, and a ground plane, the antenna component comprising:
   a dielectric substrate;
   a radiator element disposed proximate to a surface of the substrate; and
   a feed conductor configured to couple to the radiator element at a feed point;
   wherein the antenna component is configured to operate in a first mode when placed under a first operating condition, and to operate in a second mode when placed under a second operating condition;
   wherein the first mode is configured to operate as a linear polarized antenna, and the second mode is configured to operate as a right hand circular polarized (RHCP) antenna; and
   wherein the first operating condition comprises the portable communications device operating in free-space, and the second operating condition comprises the portable communications device operating under a loading condition.

2. The antenna component of claim 1, wherein the loading condition comprises the portable communications device being in electrical contact with at least a part of a user's body.

3. The antenna component of claim 1, wherein the antenna component comprises a quarter-wave antenna.

4. The antenna component of claim 1, further comprising a ground conductor configured to couple to the radiator element at a ground point.

5. The antenna component of claim 1, wherein the feed port is configured to be coupled to a ground point of the portable communications device, the coupling occurring at a point between the feed point and the ground point.

6. The antenna component of claim 5, further comprising a ground conductor configured to couple to the radiator element at the ground point.

7. The antenna component of claim 6, wherein the antenna component comprises a quarter-wave antenna.

8. The antenna component of claim 7, wherein the loading condition comprises the portable communications device being in electrical contact with at least a part of a user's body.

9. An antenna component for use in a portable communications device, the device comprising a ground, a feed port, and a ground plane, the antenna component comprising:
   a dielectric substrate;
   a radiator element disposed proximate to a surface of the substrate; and
   a feed conductor configured to couple to the radiator element at a feed point;
   wherein the antenna component is configured to operate in a first mode when placed under a first operating condition, and to operate in a second mode when placed under a second operating condition; and
   wherein the feed port is coupled to a ground point of the portable communications device, the coupling occurring at a point between the feed point and the ground point.

10. The antenna component of claim 9, wherein the first mode is configured to operate as a linear polarized antenna, and the second mode is configured to operate as a right hand circular polarized (RHCP) antenna.

11. The antenna component of claim 10, wherein the first operating condition comprises the portable communications device operating in free-space, and the second operating condition comprises the portable communications device operating under a loading condition.

12. The antenna component of claim 11, wherein the loading condition comprises the portable communications device being in electrical contact with at least a part of a user's body.

13. The antenna component of claim 9, wherein the antenna component comprises a quarter-wave antenna.

14. The antenna component of claim 9, further comprising a ground conductor configured to couple to the radiator element at the ground point.

15. The antenna component of claim 14, wherein the antenna component comprises a quarter-wave antenna.

16. The antenna component of claim 15, wherein the first operating condition comprises the portable communications device operating in free-space, and the second operating condition comprises the portable communications device operating under a loading condition.

17. The antenna component of claim 16, wherein the loading condition comprises the portable communications device being in electrical contact with at least a part of a user's body.

18. The antenna component of claim 17, wherein the first mode is configured to operate as a linear polarized antenna, and the second mode is configured to operate as a right hand circular polarized (RHCP) antenna.

* * * * *